(12) United States Patent
Ohtani et al.

(10) Patent No.: US 6,275,212 B1
(45) Date of Patent: Aug. 14, 2001

(54) ROTARY POINTER DISPLAY DEVICE

(75) Inventors: Tadashi Ohtani, Ohtawaraa; Yoshikazu Iida, Chigasaki; Hiroyuki Tsuru, Tokyo; Daiki Tsukahara, Hiratsuke; Riichi Higaki; Yukikazu Iwane, both of Kawasaki, all of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 08/352,730

(22) Filed: Dec. 2, 1994

(30) Foreign Application Priority Data

Dec. 2, 1993 (JP) .................................................. 5-302647
Dec. 2, 1993 (JP) .................................................. 5-302648

(51) Int. Cl.$^7$ .............................. G09G 3/00; G09G 3/16; G03B 17/18
(52) U.S. Cl. ............................................. 345/110; 396/281
(58) Field of Search ...................... 345/108, 110; 354/469, 470; 396/296, 281, 293, 294

(56) References Cited

U.S. PATENT DOCUMENTS 5,195,062 * 3/1993 Sase et al. .............................. 368/21
5,365,292 * 11/1994 Wakabayashi et al. ................ 354/76
5,506,651 * 4/1996 Tsujahara et al. ..................... 354/465

* cited by examiner

Primary Examiner—Jeffery Brier

(57) ABSTRACT

When displaying operational settings and measurements on a pointer type display device, the starting position of the needles is automatically adjusted even when there are battery exchange and needle drive process errors. The display device may be used to display physical quantities using pointers which move above scale plates. Even though the displays may be changed by electric supply loading, battery exchange or a fall in electric supply voltage, the display can be automatically corrected. A memory stores the movement destination position of the pointers, and instructions are generated by a controller which calculates the movement destinations of the pointers after the electrical supply voltage is stabilized properly. The instructions which control operation of a driver for the pointers preferably use a combination of movement to predefined positions and incremental movement. This minimizes the number of instructions when moving automatically, while enabling the pointers to follow movement of operator controls.

2 Claims, 17 Drawing Sheets

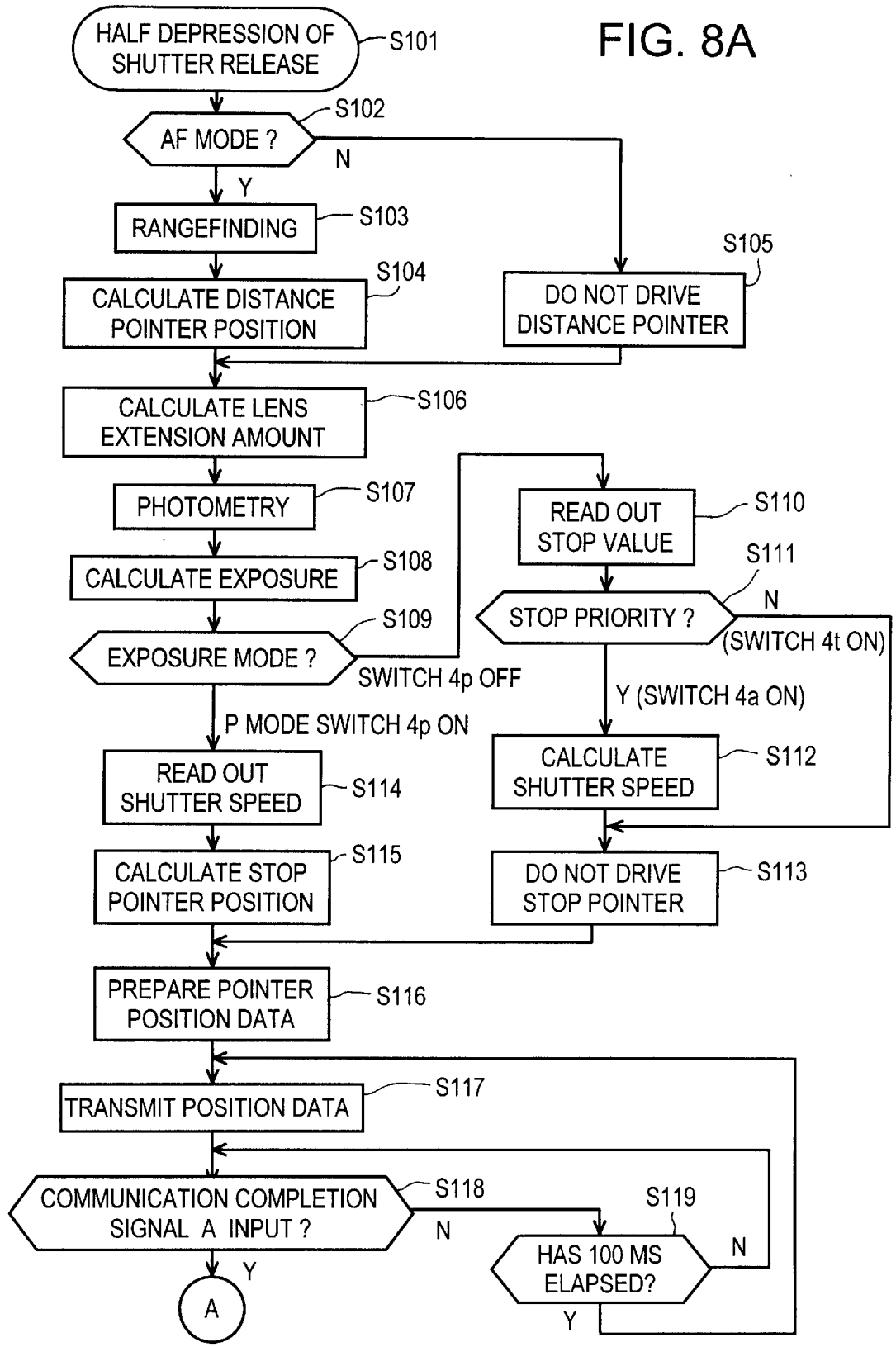

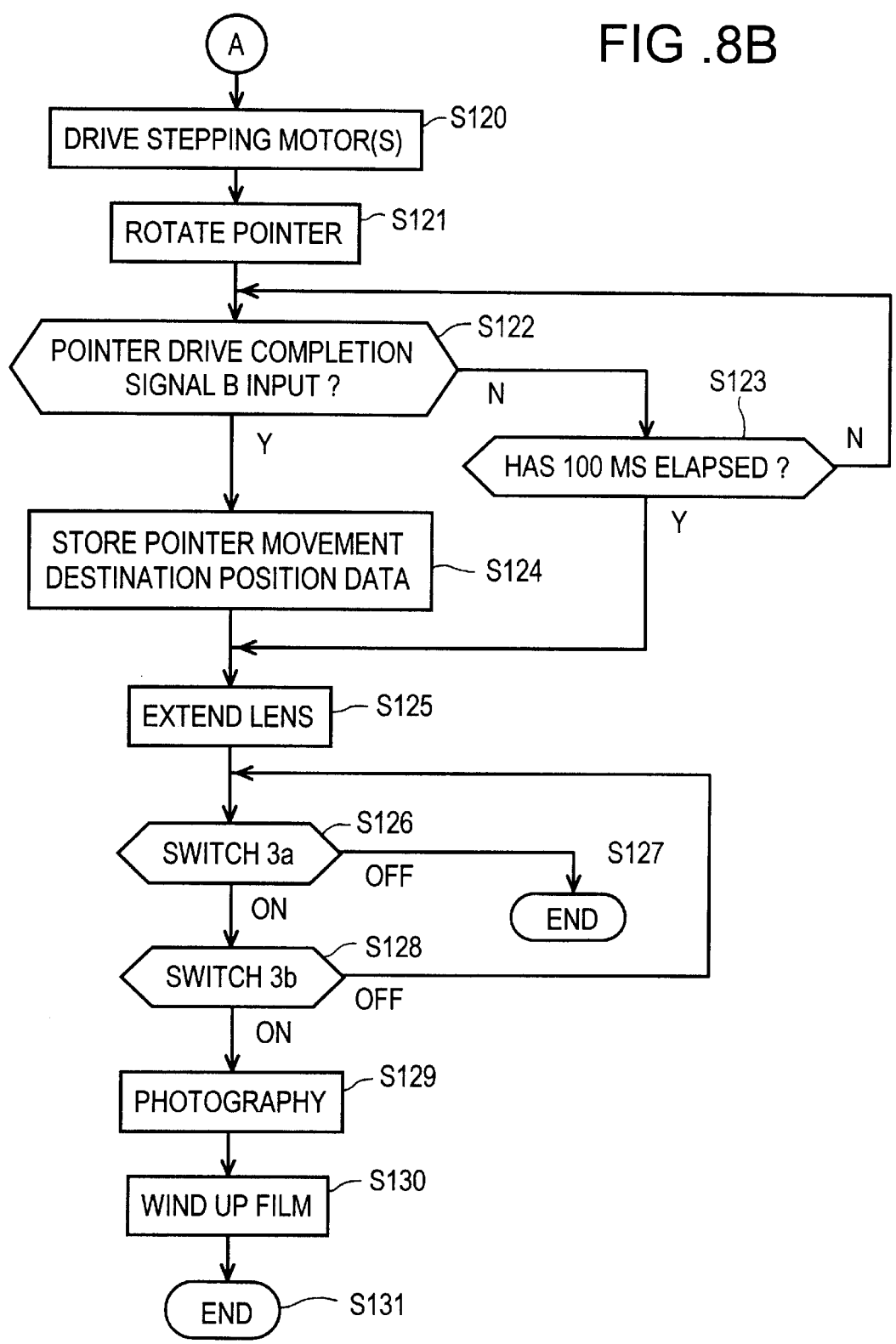

ROTARY POINTER DISPLAY DEVICE

BACKGROUND OF THE INVENTION

1. Field of the Invention

The present invention relates to display devices in which pointers are used and, more particularly, to display devices which use rotary pointers driven by stepping motors and which are particularly suitable for cameras.

2. Description of the Related Art

Conventionally stepping motors are used as drive sources for the hands of clocks and other pointer devices because they are small and have high reliability. In addition, they are inexpensive because they are manufactured in very large quantities, and are used as drive sources for many types of display devices.

However, resetting can be a problem in clocks and other display devices driven by stepping motors where several pointers are above the same face, particularly when one or more hands are used in a stopwatch function. If the starting point position of the pointers becomes displaced, due to faulty drive or due to battery exchange, it was heretofore very troublesome to use stepping motors to rotate the pointers to reset the starting point positions of the individual pointers.

In some clocks, this problem was solved by applying mechanical limiting members to bring about rotation of the hands. This enables the set values of some physical quantities and measuring values to be reset to the starting point position after battery exchange. However, due to the arrangement of components, positioning space cannot be provided for mechanical limiting members in small apparatus, such as cameras.

SUMMARY OF THE INVENTION

Accordingly, it is an object of the present invention to provide a pointer type display device which automatically adjusts the starting point position of the pointer, when set display and measured display are caused to display after batteries are exchanged and when there is a pointer drive processing error.

It is also an object of the present invention to provide a display device with which an accurate display is possible using simple hardware and software control for the operation of a camera.

It is a further object of the present invention to provide a display of a camera having a necessary and sufficient response speed.

Objects of the present invention are achieved by providing a display device comprising a display to indicate physical quantities by pointers moving over a scale plate; a display driver to drive the pointers; operator controls to change the physical quantities displayed by the display in response to manipulation by an operator; an electrical supply detector to generate a voltage change signal upon detection of at least one of battery exchange and an electrical supply voltage below a predetermined voltage; a memory to store movement information representative of the physical quantities displayed by the display; and a controller to control driving of the display by the display driver in response to the manipulation of the operator controls and storing of the movement information in the memory, and after the voltage change signal is generated, to control the driving of the pointers in the display to positions based on the movement information stored in the memory.

Objects of the present invention are also achieved by providing a display to display information by pointers moving over a scale plate; a display driver to drive the pointers; operator controls to produce operation signals indicating changes to the information displayed by the display in response to manipulation by an operator; at least one measuring device to generate measurement signals based on measurements of physical quantities; and a main controller to set movement destinations of the pointers based on at least one of the operation signals and the measurement signals and to output instruction signals representing a movement procedure for the pointers to reach the movement destinations, the display driver driving the pointers of the display based on the instruction signals.

BRIEF DESCRIPTION OF THE DRAWINGS

FIGS. 8A and 8B are a flow chart of the shutter release procedure in the first embodiment;

DESCRIPTION OF THE PREFERRED EMBODIMENTS

First Embodiment

Figure 1:
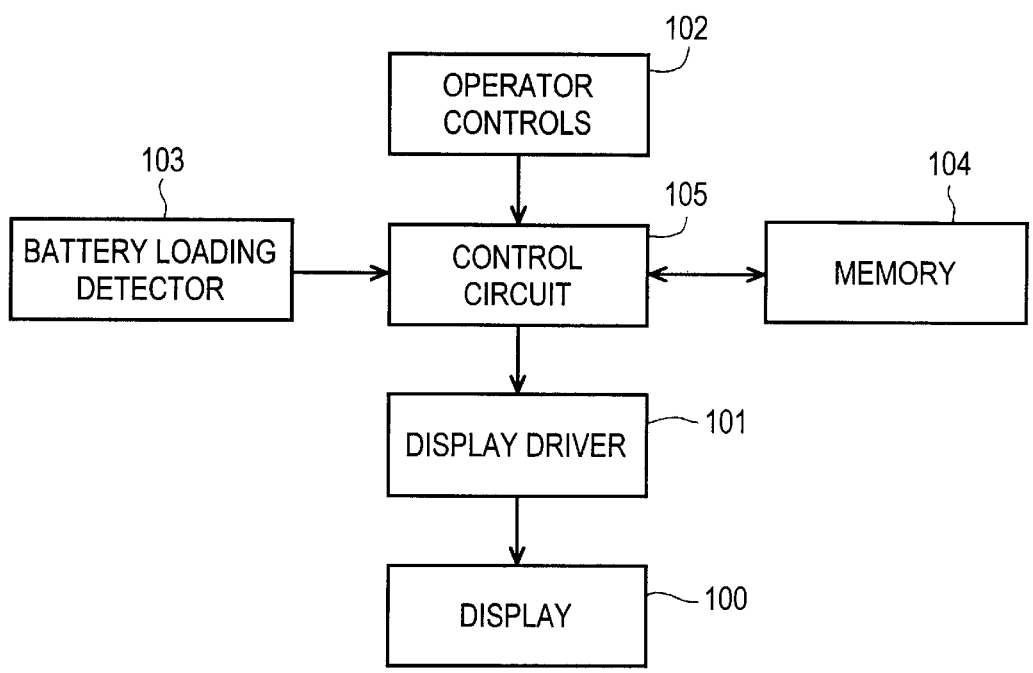
FIG. 1 is a block diagram of a display device according to a first embodiment of the present invention.

In the block diagram of a display device according to a first embodiment of the present invention illustrated in FIG. 1, memory 104 stores angle data of the movement destination of the pointer in a moving pointer type display 100. The pointer is positioned in response to signals received from operator controls 102. If the pointer stops in a state other than the starting position when a battery exchange is performed, an electric supply loading detector 103 generates a signal to a control unit 105. The electric supply loading detector may detect that the electric supply voltage has exceeded the prescribed voltage, or a switch may detect that the case in which the battery is held has been opened. Based on the respective pointer positions stored in the memory 104, a CPU within the control unit 105 calculates the amount of drive required to return the pointer of the display 100 to its starting position. The pointer is then moved to the starting position by the display driver 101 under control of the control unit 105.

Figure 2:
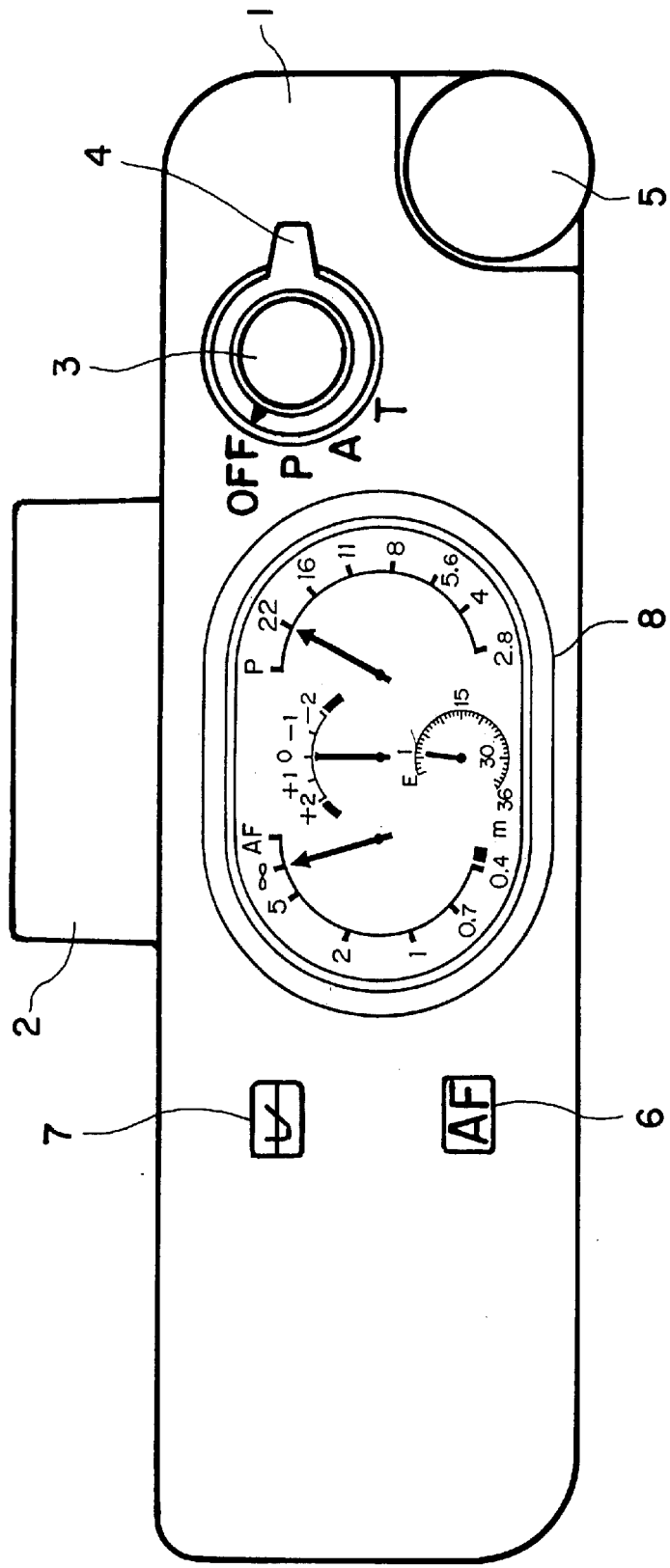
FIG. 2 is a top view of a camera equipped with the first embodiment of a display device according to the present invention.

FIG. 2 is a top view of a camera equipped with a first embodiment of a display device according to the present invention. A photographic lens barrel 2 is mounted in a camera body 1. On the top surface of the camera body 1 are a shutter release button 3, a mode selector 4, a command dial 5, an auto focus (AF) mode button 6, an exposure correction mode button 7, all of which are included in the operator controls 102 illustrated in FIG. 1, and a display unit 8 which is included in the display 100.

The mode selector 4 selects one of the following modes to control various actions of the camera: a program automatic exposure mode P (termed below the "P-AE mode") which automatically sets the exposure according to a predetermined program graph, a stop priority automatic exposure mode A, a time mode T, and a stop mode OFF.

The command dial 5 sets the stop, exposure correction value, shutter speed and the like. When the command dial 5 is rotated while depressing the AF mode button 6, it can set the automatic focus adjustment mode (termed "AF mode" below). A photographic distance from the infinity far position ∞ to the 0.4 m close position can be set in the manual focus adjustment mode (termed "MF mode" below). Moreover, when the command dial 5 is rotated when the focus correction mode button 7 is depressed, the exposure correction value can be set in a range of +2 to −2.

The display unit 8 is equipped with four (4) rotary pointer type display units comprising a photographic frame number display portion, an exposure correction display portion, a photographic distance display portion and a stop display portion.

Figure 3:
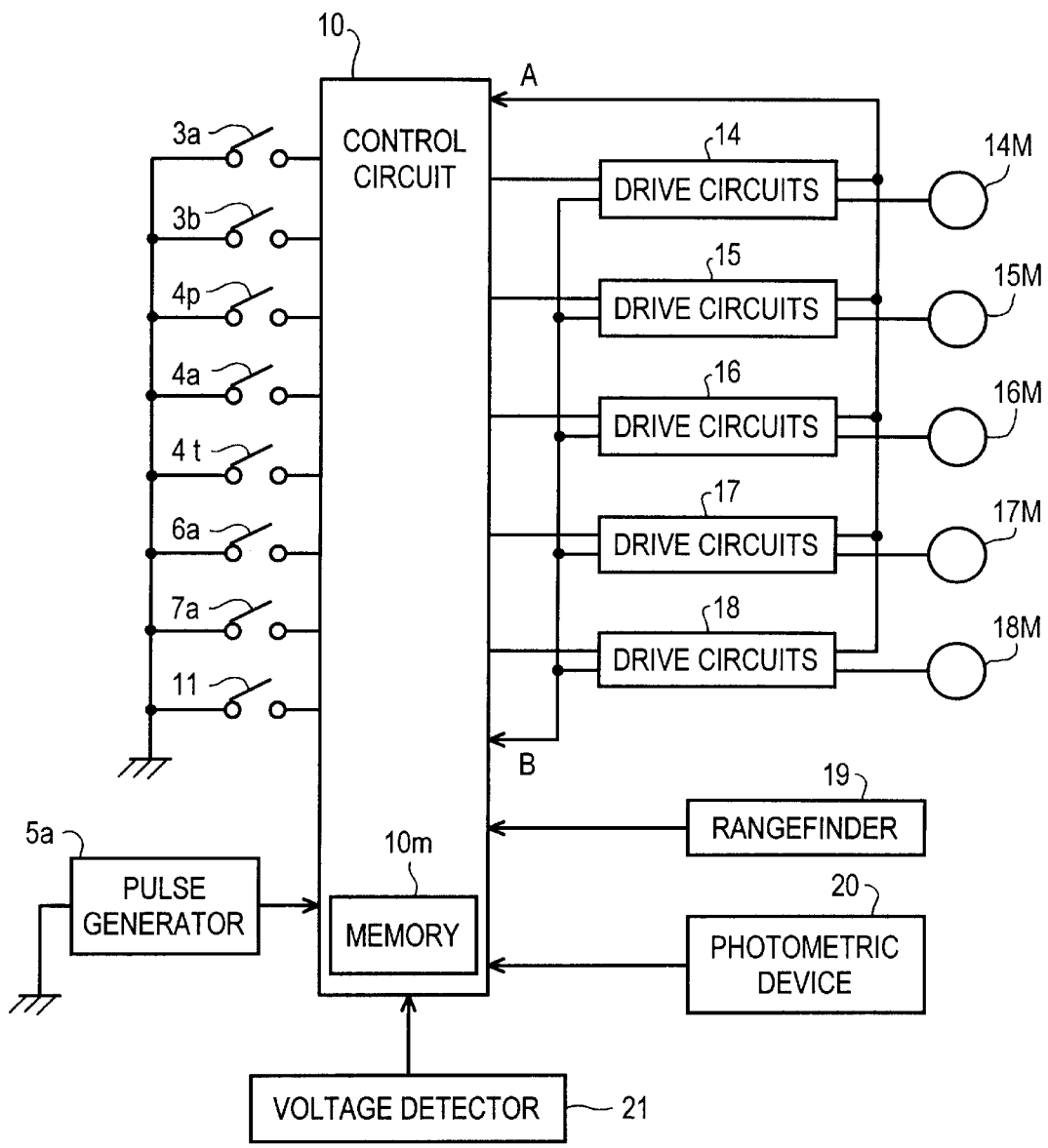
FIG. 3 is a detailed block diagram of the first embodiment illustrated in FIG. 2.

FIG. 3 is a block diagram of the first embodiment of a display device according to the present invention. A control circuit 10 with a microcomputer, and conventional peripheral components are included in the control unit 105. Also included in the control circuit 10 is a non-volatile memory (EEPROM) 10m which provides the memory 104. The control circuit 10 controls the camera sequence of operations, performs various calculations, and performs display control by executing the program described below.

Switches 3a and 3b are ON/OFF switches coupled to the shutter release button 3. Switch 3a is set ON when the shutter release button 3 is half depressed, and switch 3b is set ON when it is fully depressed. Switches 4p, 4a and 4t are ON/OFF switches coupled to the mode selector button 4. Switch 4p is set ON when the mode selector 4 is in the P position, switch 4a is set ON when the mode selector 4 is in the A position and switch 4t is set ON when the mode selector 4 is in the T position. Moreover, switch 6a is set ON when the AF mode button 6 is depressed; switch 7a is set ON when the exposure correction mode button 7 is depressed, and switch 11 is set ON when the battery compartment cover is opened. These switches are connected to the control circuit 10.

Also connected to the control circuit 10 are drive circuits 14–18. Drive circuit 14 drives a film advance motor 14M. Stepping motors 15M–18M are driven by respective drive circuits 15–18, to drive the rotation of each pointer of the four display portions of the display unit 8. The display driver 101 includes the drive circuits 14–18 and stepping motors 14M–18M. The stepping motor 15M provides rotary drive for the pointer of the photographic frame number display portion and the stepping motor 16M provides rotary drive for the pointer of the exposure correction display portion. Furthermore, the stepping motor 17M provides rotary drive for the pointer of the photographic distance display portion, and the stepping motor 18M provides rotary drive for the pointer of the stop display portion. When drive signals are being transmitted from the control circuit 10 to the drive circuits 14–18, a transmission completion signal A or a pointer drive completion signal B is output from the drive circuits 14–18 to the control circuit 10.

In addition, the control circuit 10 is connected to sensors and a pulse generator 5a, which generates pulses according to the direction of rotation of the command dial 5. A rangefinder 19 detects the photographic distance to the subject, and outputs a range value to the control circuit 10. A photometric device 20 detects the subject luminosity, and outputs a photometric value to the control circuit 10. During battery insertion at the time of battery exchange, a battery exchange detector 21 outputs a signal if the electric supply voltage exceeds a predetermined voltage and a battery loading output is detected from a switch 11 triggered by a battery exchange operation. A voltage detector 21 and switch 11 are included in the battery loading detector 103.

Figure 4:
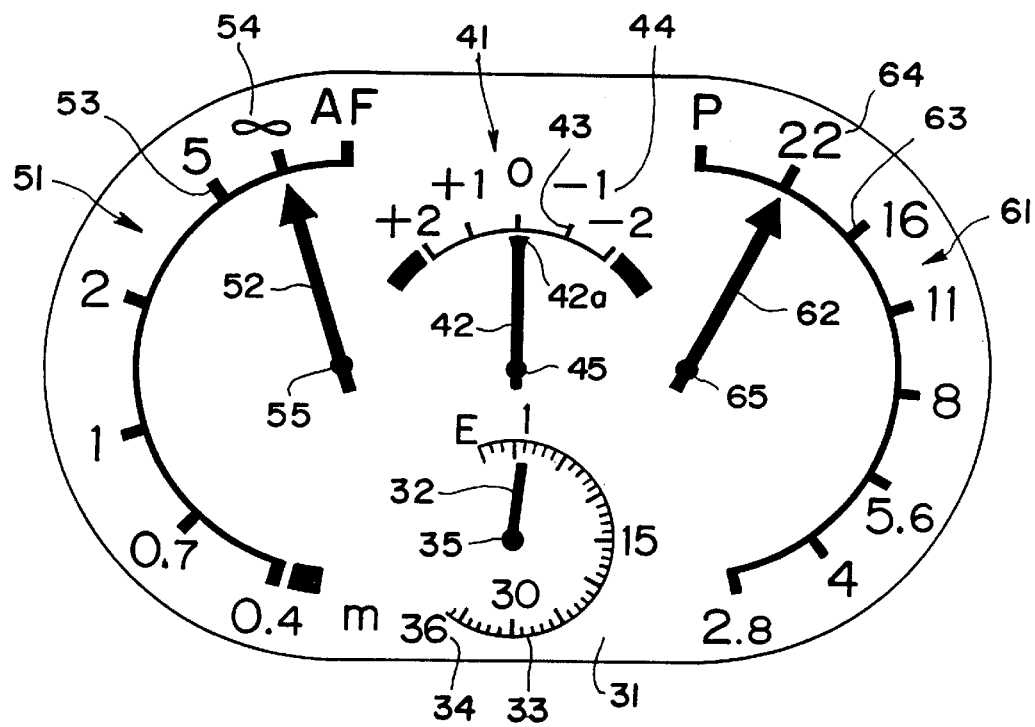
FIG. 4 is an enlarged view of the display unit in the first embodiment illustrated in FIG. 2.

FIG. 4 is an enlarged view of the display unit 8. A photographic frame number display portion 31 indicates the number of frames of the film which have been completed and comprises a pointer 32, scale 33, and a numerical value 34 showing a representative frame number. The center of rotation 35 of the pointer 32 is also illustrated.

The control circuit 10, when it advances the film by driving the film advance motor 14M, provides a rotary drive for the pointer 32 in proportion to the amount of advance, by driving the stepping motor 15M. In addition, the present drive amount of the pointer 32 is incremented by the drive amount θ1 and stored in the memory 10m.

An exposure correction display portion 41 comprises a pointer 42, scale 43, and numerical values 44 representing the exposure correction amount. The pointer 42 has a tip 42a formed with an arcuate shape and a center of rotation 45. The control circuit 10 inputs pulse signals from pulse generator 5a when the switch 7a is set ON, and according to the characteristics of input pulse number and direction of rotation, provides a rotary drive for the pointer 42 by means of the stepping motor 16M. In other words, the rotary drive is one scale division (about 18°) per pulse. At the same time, the drive amount is added to the amount of rotation θ2 of the pointer 42 stored previously in the memory 10m.

A photographic distance display portion 51 comprises a pointer 52 with a center of rotation 55 and a scale plate 53 with numerical values and symbols 54 representative of the AF mode and the photographic distance, including ∞ to denote a range of infinity. The stop display portion 61 consists of a pointer 62 and scale plate 63 with numerals and symbols 64 denoting the stop value and P-AE mode. The pointer 62 of the stop display portion 61 has a center of rotation 65.

The control circuit 10 inputs pulse signals from the pulse generator 5a when the switch 6a is set ON, and according to the number of pulses and direction of rotation, provides a rotary drive for the pointer 52 by the motor 17M. The rotation is one scale division per input pulse. For example, in the case of changing from the AF mode to the infinity position ∞ of the MF mode, while depressing the AF mode button 6 the command dial 5 rotates by 1 pulse, the pointer 52 rotates from the AF position to the infinity position ∞.

The control circuit 10, moreover, provides a rotary drive for the pointer 52, and at the same time adds the present drive amount to the drive amount θ3 stored for the pointer 52 in the memory 10*m*.

Figure 5:
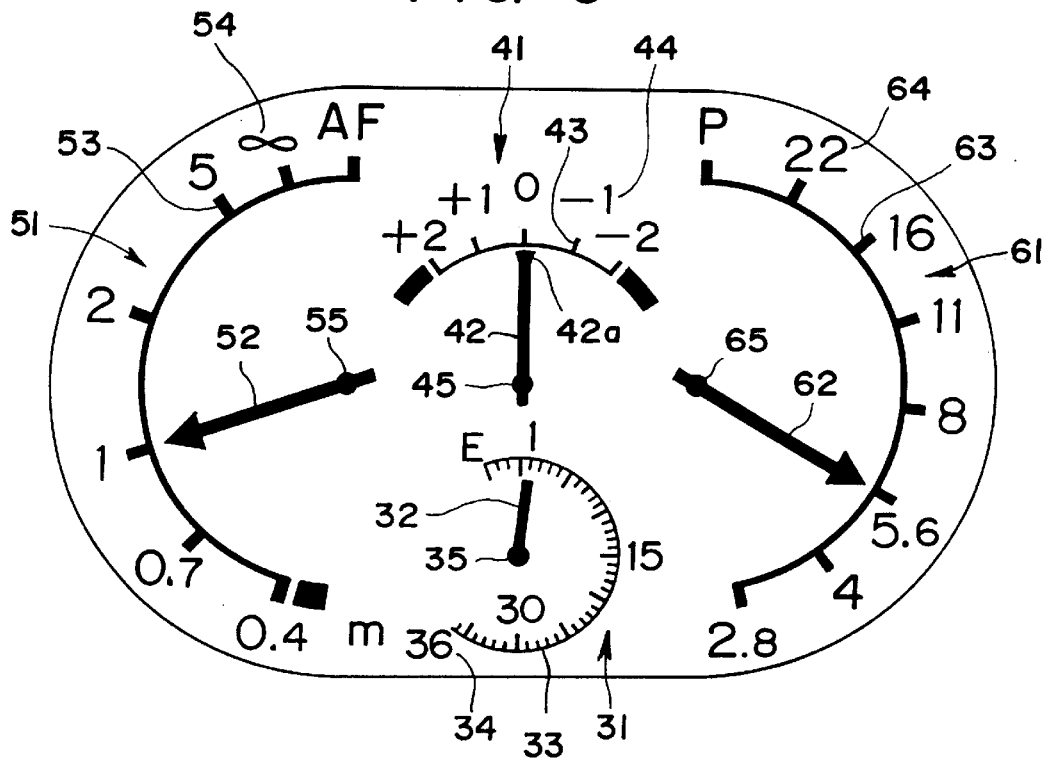
FIG. 5 is a diagram showing a display example of the display unit of the first embodiment illustrated in FIG. 2.

On the other hand, if the AF mode is set, when the shutter release button 3 is half depressed so that the switch 3*a* is set ON, the control circuit 10 drives the pointer 52 from the AF position to the position of the photographic distance detected by the rangefinder 19. For example, when the rangefinder 19 detects a photographic distance of 1 m, as shown in FIG. 5 the pointer 52 rotates to the 1 m scale position.

The control circuit 10 inputs pulses from the pulse generator 5*a* when the switch 4*a* is set ON, and according to the number of pulses and direction of rotation, provides a rotary drive for the pointer 62 by means of the motor 18M. Here the rotation is 1 scale division per input pulse. For example, in the case of changing from the program automatic mode P mode to the stop priority exposure mode A, and setting F22, the mode selector 4 is moved to the A position, the command dial 5 rotates by 1 pulse, the pointer 62 rotates from the P position to the F22 position. The control circuit 10 controls the rotary drive of the pointer 62 and at the same time adds the present drive amount to the drive amount θ4 stored previously in the memory 10*m*.

On the other hand, if the mode selector 4 is in the P position, namely the program automatic exposure mode P is set, when the shutter release button 3 is half depressed and the switch 3*a* is set ON, the control circuit 10, according to the subject luminosity detected by the photometric device 20, finds a stop value based on a program graph stored previously in the memory 10*m*, and provides a rotary drive for the pointer 62 up to this stop value. For example, when F 5.6 is obtained as the stop based on the subject luminosity detected by the photometric device 20 and the program graph, as shown in FIG. 5 the pointer 62 rotates to the F5.6 scale position.

Figure 6:
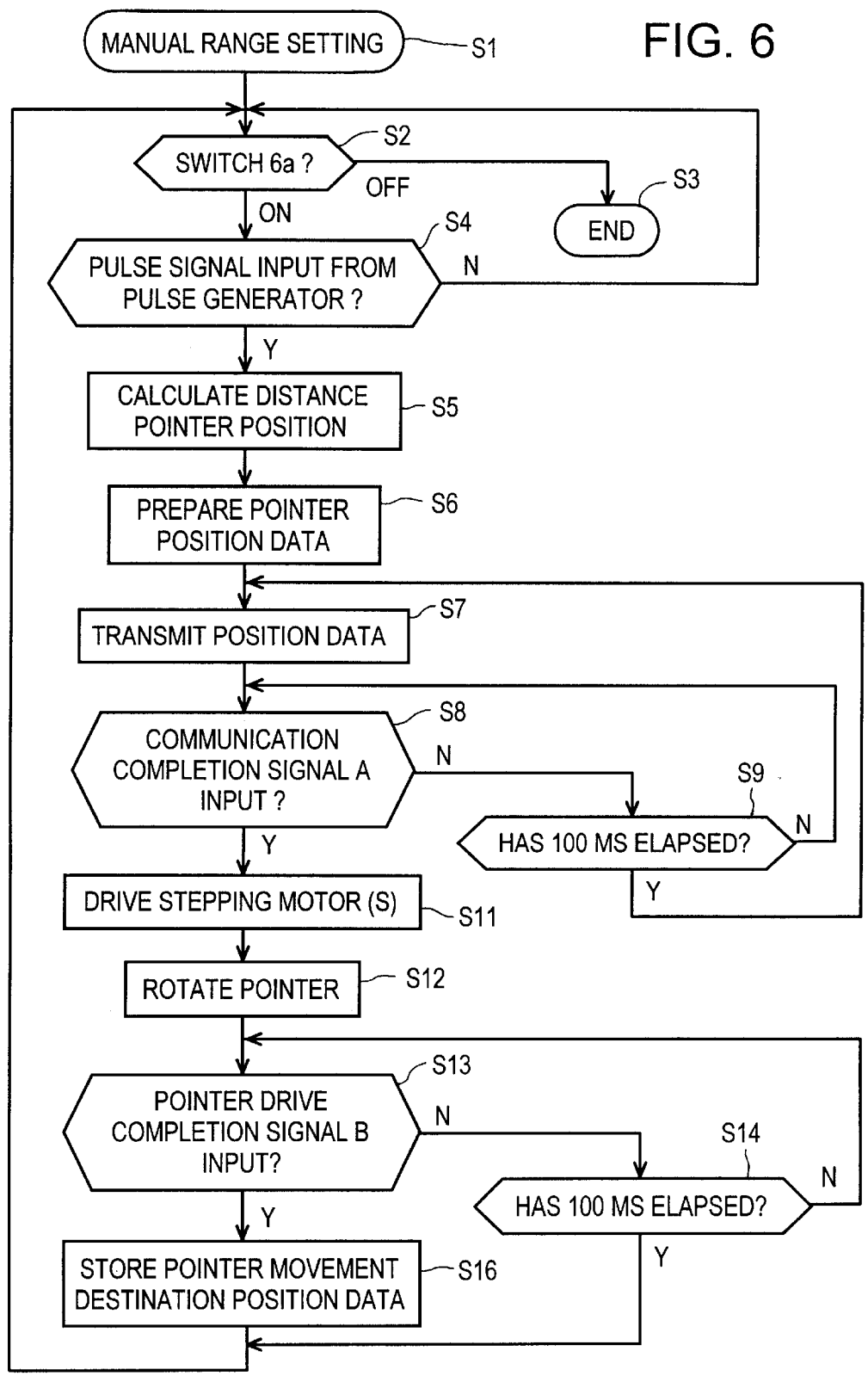
FIG. 6 is a flow chart of the manual focus adjustment mode in the first embodiment.

FIG. 6 is a flow chart showing the manual focusing adjustment mode procedure. When the switch 6*a* if OFF, procedure ends. However, when the AF mode button 6 is operated and the switch 6*a* set to ON as determined in step S2, the microcomputer of the control circuit 10 begins the procedure illustrated in FIG. 6. In step S4, it is determined whether pulse signals have been input from the pulse generator 5*a*. If pulse signals have been input, the procedure continues with step S5, and if not, execution of the procedure ends. As described above, the pulse generator 5*a* outputs pulse signals according to the rotation amount and rotation direction of the command dial 5. in step S5, pointer position data are calculated, according to the pulses from the pulse generator 5*a*, to drive the pointer 52 in rotation. The pointer position data calculated in step S5 are prepared for output in step S6. In step S7, the drive signal is output from the control circuit 10 to the drive circuits 14–18.

In step S8, it is confirmed whether the drive circuits 14–18 have received correct data. If communication completion signal A is not received, the control circuit 10 repeats step S8 for 100 ms. If the confirmation signal is not received for 100 ms, it is assumed in step S9 that the transmission of the pointer drive data has been interrupted, due to interruption of other switch signals and the like and the procedure returns to step S7 to transmit the position data again. Although not illustrated in FIG. 6, if transmission of position data is tried a number of times without success, the procedure ends and further operator controls are awaited.

On the other hand, if it is determined in step S8 that the communication end signal A has been received, the stepping motor 17M is driven (step S11) to rotate (step S12) the pointer. When the rotation of the pointer 52 is determined to be completed in step S13 by receipt at the control circuit 10 of a pointer drive completion signal B from the drive circuits 14–18, in step S16 the data of the movement destination of the pointer 52 are stored in the memory 10*m*. Preferably an EEPROM or the like is used for the memory 10*m*, so that the data can be retained even if the battery is removed. On the other hand, if the pointer movement completion signal B is determined in step S14 to be not received within 100 ms, it is decided that the action of pointer drive has been discontinued, due to the interruption of other switch signals and the like in the control circuit 10. In this case, updating of position data of the pointer movement destination is inhibited and the procedure returns to step S2 where the next switch input is awaited.

Figure 7:
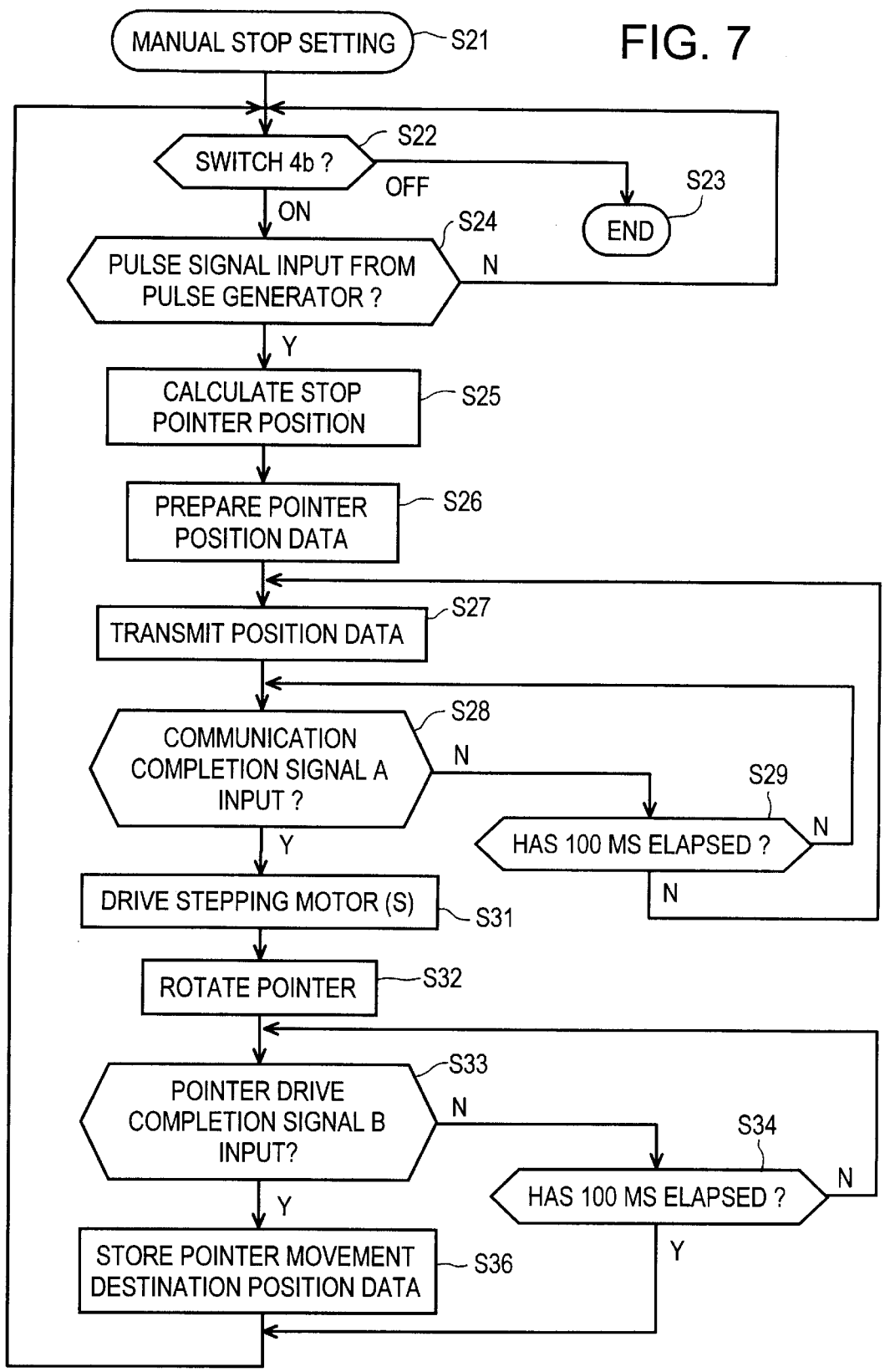
FIG. 7 is a flow chart of the stop priority automatic exposure mode in the first embodiment.

FIG. 7 is a flow chart of the stop priority automatic exposure mode procedure. When the AF mode button 6 is operated and switch 6*a* is ON, the microcomputer in the control circuit 10 begins execution of the procedure illustrated in FIG. 7. In step S22, if the mode selection is in anything other than the A position which activates switch 4*b*, the procedure ends. In step S24, it is determined whether pulse signals have been input from the pulse generator 5*a*. If pulse signals were input, the procedure continues with step S25, and if not, execution of the program ends. In the abovementioned manner, the pulse generator 5*a* outputs pulse signals according to the amount and direction of rotation of the command dial 5. In step S25, the needle position data are calculated according to the pulse signals which have been input from the pulse generator 5*a*. Then, the pointer position data are prepared in step S26 and the drive position data are transmitted from the control circuit 10 to the drive circuits 14–18 in step S27. Whether the drive circuit received the correct data from transmitting the aforementioned drive signal is confirmed in step S28 by determining whether the communication completion signal A has been received. If the communication completion signal A is not received within 100 ms, it is decided in step S29 that the transmission of needle drive data has been interrupted due to the interruption by other switch signals and the like and the transmission of position data is performed again in step S27. Although not illustrated in FIG. 7, if the transmission of position data is not successful in a predetermined number of attempts, processing ends and further operator controls are awaited in step S22.

On the other hand, if the communication completion signal A is received within 100 ms, the procedure continues with steps S31 and S32, driving stepping motor 18M to rotate the pointer 62. When the drive of the pointer 62 is complete, a pointer drive completion signal B is output from the drive circuit 18 to the control circuit 10. In steps S33 and S34, the control circuit 10 waits 100 ms for receipt of the pointer drive completion signal B. If the pointer drive completion signal B is received within 100 ms, the data of the movement destination of the pointer 62 are stored in the memory 10*m*. On the other hand, if the pointer drive completion signal B has not been received within 100 ms, it is decided that the needle drive action data has been interrupted, due to the interruption by other switch signals and the like in the control circuit 10. In this case, the updating of position data of the movement destination of the needle is inhibited and the procedure returns to step S22 and further operator controls are awaited in step S22. Assuming the pointer drive completion signal B has been completed, in the stop priority automatic exposure mode the set value of the stop is displayed on the stop display portion 61.

FIGS. 8A and 8B are flow charts of the shutter release procedure. The microcomputer of the control circuit 10, when the shutter release button 3 is half depressed and switch 3*a* is set ON, begins execution of the procedure at step S101. In step S102, it is determined whether the AF mode is set; in which case the pointer 52 of the photographic distance display portion 51 will be in the AF position. If the AF mode is set, the procedure continues with step S103, and if not, it is decided that camera is in the MF mode and the routine proceeds to step S105. When the AF mode is set, in step S103 the photographic distance is detected by the rangefinder 19, the distance pointer position is calculated in step S104, and the procedure continues with step S106. However, if the MF mode is set, the manual focus adjustment mode procedure illustrated in FIG. 6 has been executed previously, to drive the distance pointer to the position manually set by operation of the command dial 5. In either mode, the amount of extension of the lens is calculated based on the distance determined (by the rangefinder 1*a* or the manually set distance).

Subject luminosity is detected by the photometric device 20 in step S107, and an exposure calculation is performed in step S108. In step S109, it is determined whether the P-AE mode is set by the mode selector 4. If the P-AE mode is set, the switch 4*p* is ON and the procedure continues with step S114. In the P-AE mode, the shutter speed is read in step S114 and the stop value is calculated in step S115 based on the subject luminosity detected by the photometric device 20 using the previously stored program graph. Then, the procedure continues with step S116.

If it is determined in step S109 that the P-AE mode is not set by detecting that the switch 4*p* is OFF, the procedure continues with step S110. In step S110, the stop value is read out in order to operate in the stop priority automatic exposure mode or the time mode. In step S111, it is determined whether the stop priority automatic exposure mode A or the time mode T is set. If switch 4*a* is set ON, the stop priority exposure mode is set and the shutter speed is calculated using the subject luminosity detected by the photometric device 20 in step S112, and the procedure continues with step S113. If switch 4*t* is set ON in step S111, the time mode T is set and step S113 is performed immediately to set an indication that the stop pointer should not be driven. In the time mode T, a timer mode procedure, not shown in the drawing, is executed, and when switch 3*b* is set ON by full depression of the shutter release button 3, the shutter blind is opened, and when full depression is carried out a second time, the shutter blind is closed, making a time exposure possible. In step S113, because the stop pointer has already been set at the time of the aforementioned manual stop setting operation in FIG. 7, there is no need to drive the stop needle, and the procedure continues with step S116.

In step S116, pointer position data are prepared for each pointer, so that in the P-AE mode the distance pointer 52 and stop pointer 62 can be driven and in the stop priority exposure mode and time mode only the distance pointer 52 can be driven. If the MF mode was detected in step S102, the distance pointer 52 already has been moved to the position which was set at the time of the distance setting operation illustrated in FIG. 6 and the pointer action is inhibited in step S116. In step S117, drive signals are transmitted from the control circuit 10 to the drive circuits 17 and 18 to cause movement of pointers 52 and 62 and the procedure continues with step S118.

Whether the drive circuit received the correct data from transmitting the aforementioned drive signal is confirmed in step S118 by determining whether the communication completion signal A has been received. If step S118 determines that the communication completion signal A was received, the procedure continues with step S120. If the communication completion signal A is not received within 100 ms, it is decided in step S119 that the transmission of needle drive data has been interrupted due to the interruption by other switch signals and the like and the transmission of position data is performed again in step S117. Although not illustrated in FIG. 7, if the transmission of position data is not successful in a predetermined number of attempts, processing ends and the procedure continues with step S120 of FIG. 9.

In steps S120 and S121, stepping motor(s) 17M and 18M are driven, rotating the pointer 52 up to the photographic distance if calculated in step S104 to display the measurement value of the photographic distance on the photographic distance portion 51 and rotating the pointer 62 to the calculated stop value to display the measured value of the stop on the stop display portion 61 in the P-AE mode. In step S122, when the drive of the pointer(s) is completed, a pointer drive completion signal B is input to the control circuit 10 from the drive circuits 17 and 18 and in step S124 the data of the movement destinations of pointer 52 and the pointer 62 are stored in the memory 10*m*. By using an EEPROM as the memory 10*m*, data can be retained even if the battery is removed. The EEPROM may be included in the microcomputer on the same IC, or on a different IC. On the other hand, if the pointer drive completion signal B is not received within 100 ms, it is decided in step S123 that the needle drive action data has been interrupted due to the interruption by other switch signals and the like in the control circuit 10. In this case the updating of position data of the movement destination of the needle is inhibited, and the routine proceeds to step S125.

In step S125, a photographic lens motor is driven by a motor drive circuit, both not shown in the drawings, to position the lens at a position corresponding to the photographic distance detected by the rangefinder 19. If it is determined in step S126 that the shutter release button 3 is no longer half depressed (activating switch 3*b*), the procedure ends. Otherwise, in step S128, it is determined whether switch 3*b* is set ON by full depression of the shutter release button 3. If the shutter release button 3 is not determined to be fully depressed in step S128, the procedure repeatedly checks for full depression of the shutter release button 3 in step S128 or return to no depression in step S126 until one of these conditions occur. If the shutter release button 3 is fully depressed, the procedure continues with step S129 to perform photographic actions by means of a shutter control unit, stop unit and the like not shown in the drawings. Then, in step S130, the control circuit 10 controls drive circuit 14 to drive the film forwarding motor 14M to advance the film before ending the procedure.

Figure 9A:
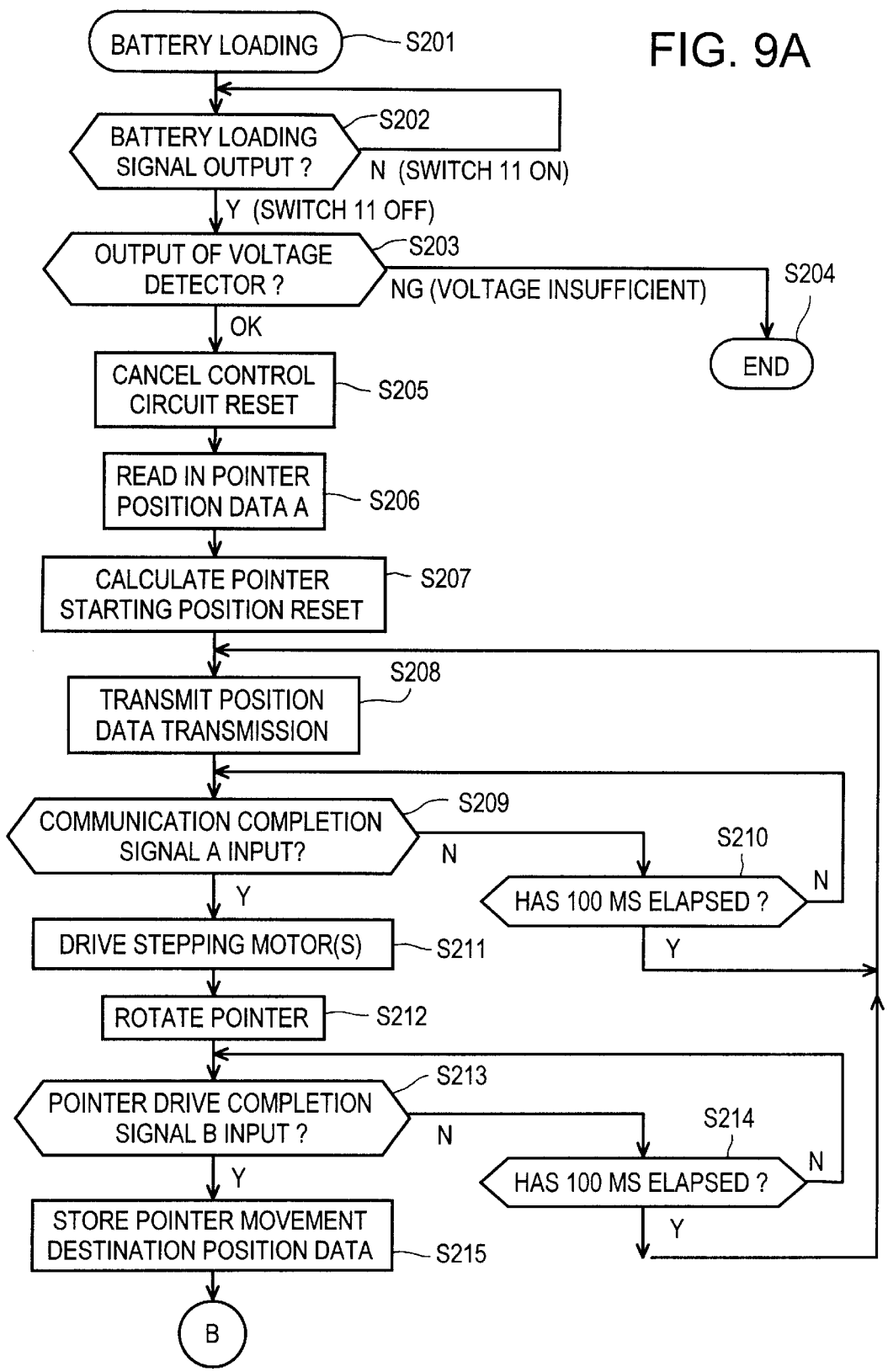
FIGS. 9A and 9B are a flow chart of the battery loading operation procedure in the first embodiment.
Figure 9B:
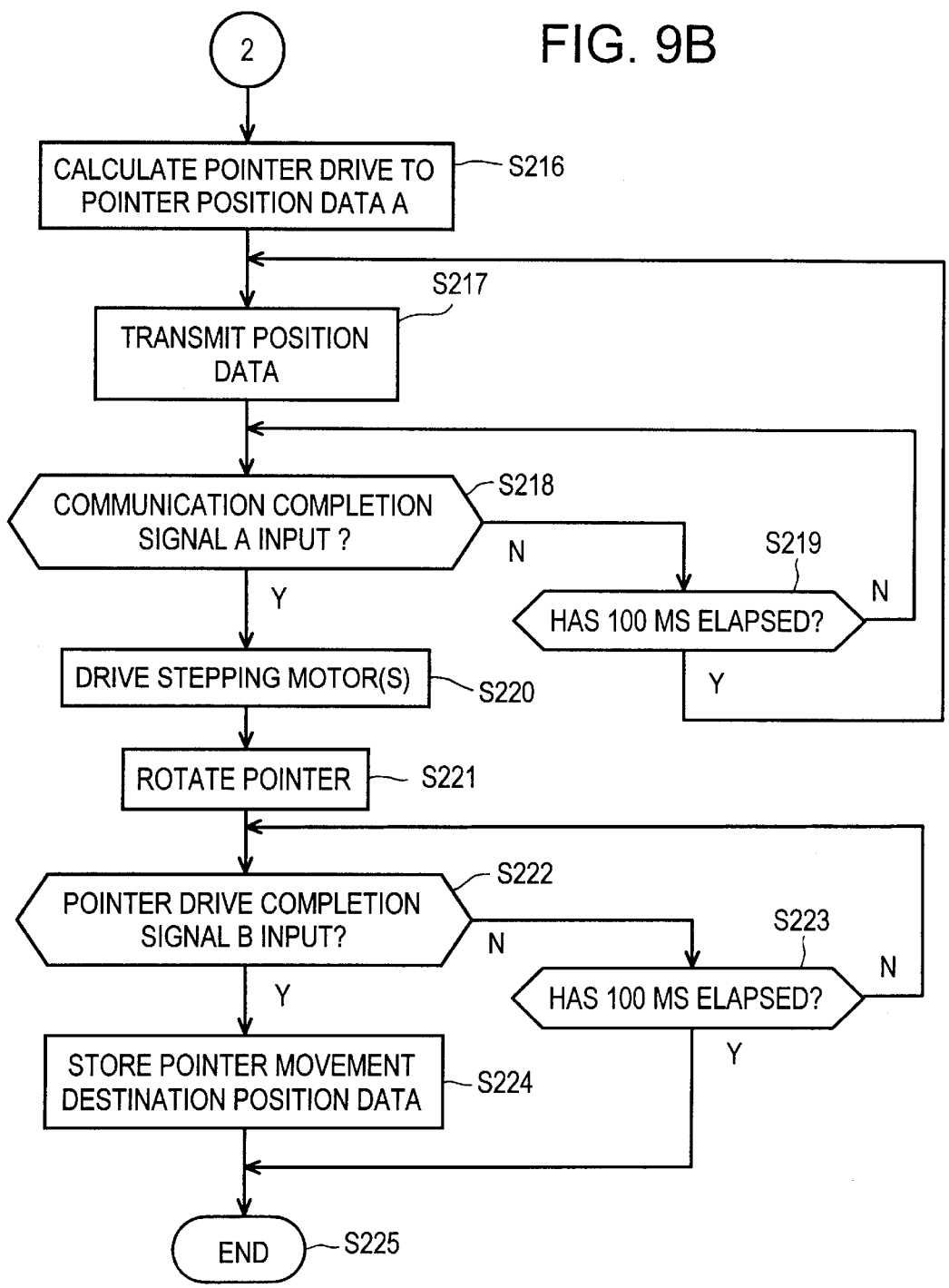

FIGS. 9A and 9B are a flow chart of a battery loading operation procedure. When a battery is loaded in step S201, the microcomputer of the control circuit 10 begins execution of a battery loading procedure. While the battery compartment is open, the output of switch 11 is determined in step S202 to be ON and as a result, the reset state of the control circuit 10 is maintained. It is determined in step S202 that the battery compartment is closed when the switch 11 changes from ON to OFF. In step S203, the control circuit 10 receives a signal from the voltage detector 21 to determine whether the voltage is sufficient to make operation possible. If the voltage is sufficient, the reset state of the microcomputer within the control circuit 10 is canceled, and the procedure continues with step S206. However, if it is decided in step S203 that the voltage insufficient, the procedure ends in step S204.

After the reset of the control circuit 10 ends in step S205, pointer position data A stored in the EEPROM is read into the control circuit 10 in step S206. Then, drive position data signals are obtained in step S207 to drive the pointers to their respective starting positions. The starting position of each pointer are as follows: the position of the photographic frame display pointer indicates 0 frames, the position of the stop display pointer indicates P, the position of the AF pointer indicates AF, and the position of the exposure correction display pointer indicates a correction amount 0.

Drive position signals are output in step S208 to transmit drive position data signals from the control circuit 10 to the drive circuits 14–18. Whether the drive circuits 14–18 received the correct data from transmitting the aforementioned drive signal is confirmed in step S209 by determining whether the communication completion signal A has been received. If step S209 determines that the communication completion signal A was received, the procedure continues with step S211. If the communication completion signal A is not received within 100 ms, it is decided in step S210 that the transmission of pointer drive data has been interrupted due to the interruption of other switch signals and the like and the transmission of position data is performed again in step S208. Although not illustrated in FIG. 9A, if the transmission of position data is not successful in a predetermined number of attempts, the battery loading procedure may compulsorily end.

On the other hand, in the case that the communication completion signal A was received, the procedure continues with steps S211 and S212, driving stepping motors to rotate the respective pointers 32, 42, 52 and 62. It is determined whether the drive of the pointers is completed in step S213 based on a pointer drive completion signal B from the drive circuits 14–18. If the pointer drive completion signal B is not received within 100 ms, it is decided that the needle drive action data has been interrupted, due to the interruption of other switch signals and the like in the control circuit 10 and the procedure returns to step S208 to transmit the position data again. When the drive of the pointers is determined to be complete in step S213, the data of the movement destination of each pointer 32, 42, 52 and 62 is stored in the memory 10*m* in step S215.

In step S216, based on the position data for the pointers prior to the removal of the battery, calculations are performed for driving each pointer. Data will be created to move the photographic frame display pointer 32 to the position indicated by the pointer position data. Data for the stop display pointer 62 is calculated based on the present position of the mode selector 4. In the P-AE mode, the stop display pointer 62 will be moved to the P position. In the A and T modes, the stop display pointer 62 will be moved to the position indicating the newest stop set position which has been stored in the EEPROM. In the AF mode, data will be created to move the AF pointer 52 to the AF position. The position of the exposure correction display pointer 32 will continue to indicate a correction amount 0. When the pointer drive calculation is completed, steps S217 to S224 are executed to perform the same procedure as described above for steps S208 to S215, to update the memory and complete positioning of each pointer, and thus, end the battery loading operation procedure.

As described above, camera operation information displayed using plural pointers can be automatically reset to the starting position, when the output signal of a battery switch and the output signal of a voltage detector 21 are obtained during battery loading. Furthermore, the position of each pointer 32, 42, 52 and 62 can be returned to the positions which were displayed prior to the removal of the battery.

In the first embodiment, the present invention has been applied to the display unit of a camera, but the present invention is not limited to the display unit of a camera and, for example, can be suitable for a clock with a chronograph function, or also for automobile instruments, etc. Despite an exchange of batteries or an interruption of electrical power, it is possible for the rotary pointers to be automatically returned to their starting positions or to their display positions prior to the battery exchange. In this manner, the user of the camera avoids troublesome readjustment of the pointer positions of the pointer displays. Moreover, in the case of returning the pointers to the starting positions, no mechanical limiting members are needed, and it is possible to make the size of the camera small.

In the first embodiment, the pointers move according to the operation of operator controls and movement information of the pointers is stored in a memory. When the electric supply detector detects battery exchange or a fall of the electric supply voltage, the movement information stored in the memory is used to control movement of the pointers to standard positions by the display drivers. As a result, there is no necessity to perform troublesome position adjustment of the pointers.

Second Embodiment

Figure 10:
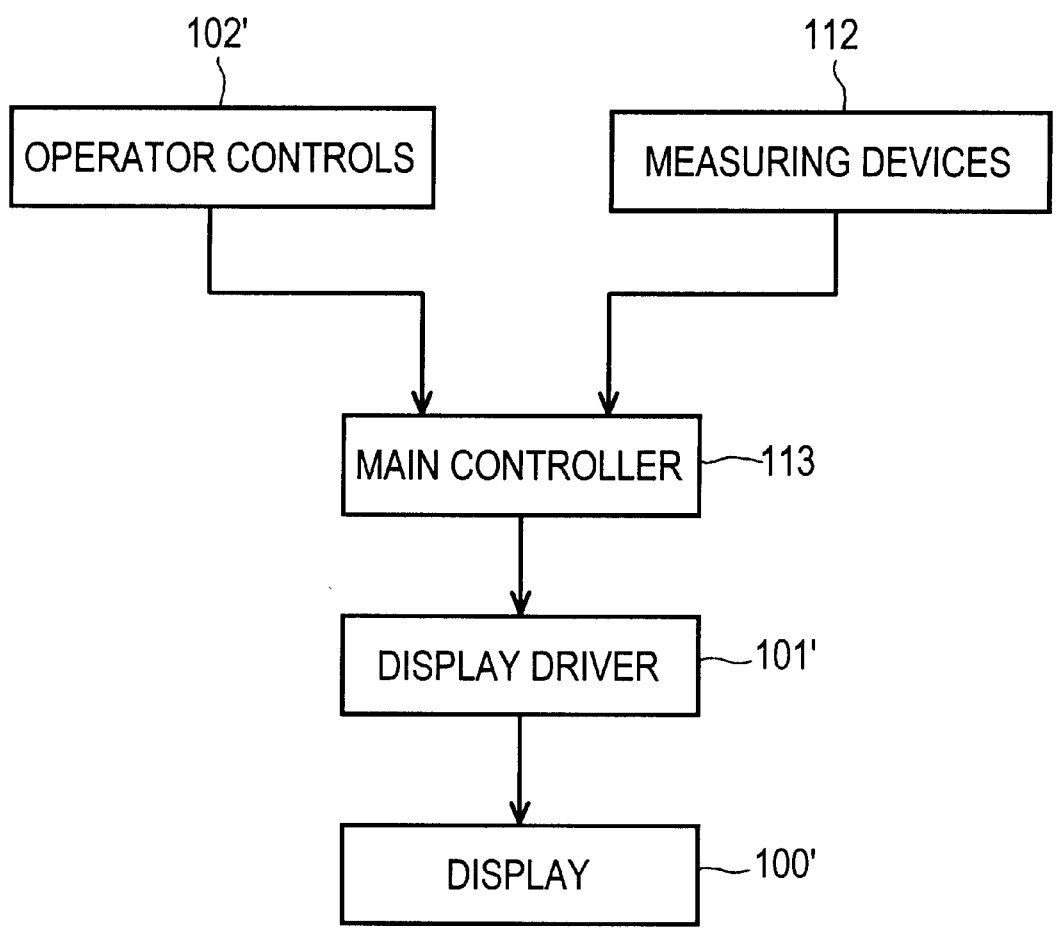
FIG. 10 is a block diagram of a second embodiment of a display device according to the present invention.

As illustrated in FIG. 10 in the second embodiment of the present invention, a main controller 113 controls the sequence and exposure calculations, etc., of a camera, and a display driver 101' drives a pointer display 100' based on signals from the main controller 113. Drive control of the pointers is preferably performed by transmitting serial or parallel logic signals from the main controller 113 to the display driver 101'. The logic signals include an indication angle needle manipulation instruction to rotate one pointer in an indication direction by an indication angle; a movement destination indication needle manipulation instruction for needle manipulation of one pointer to a position which has been indicated; a two-needle standard position needle manipulation instruction to drive two pointers simultaneously to standard positions; and a two-needle movement destination indication needle manipulation instruction to simultaneously perform needle manipulation of two pointers to positions which have been indicated. With a small number of instructions due to an instruction makeup such as the above, needle manipulation with a fast response speed becomes possible, according to the operation of the camera.

Figure 11:
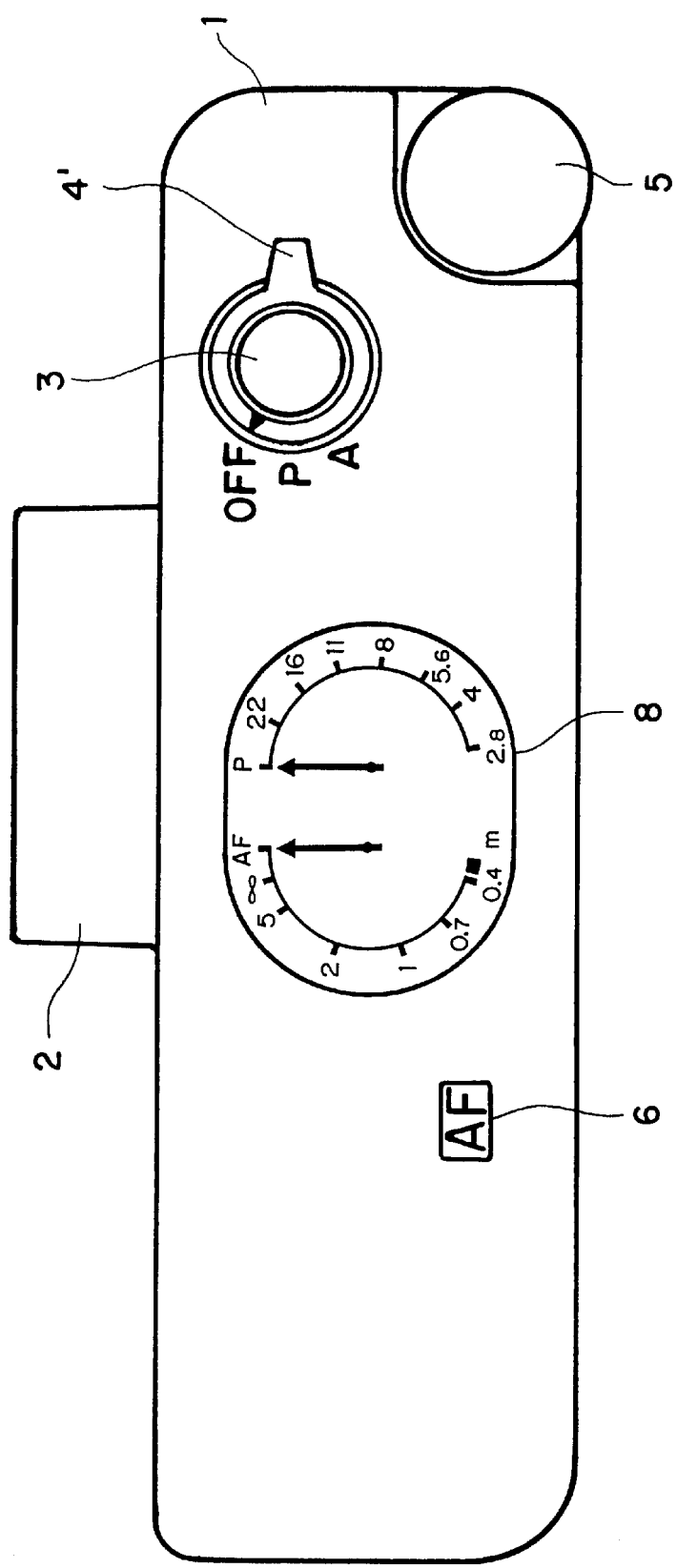
FIG. 11 is a top view of a camera equipped according to the second embodiment of a display device according to the present invention.

FIG. 11 is a top view of a camera equipped with a second embodiment of a display device according to the present invention. With the exception of the mode selector 4' and the display unit 8' and the lack of an exposure correction mode button 7, the components of the camera illustrated in FIG. 11 are the same as in FIG. 2 and therefore, only the differences will be described. The second embodiment of the present invention is applied to a camera in which the mode selector 4' selects between the program automatic exposure mode P (P-AE mode) which controls the camera according to a previously established program graph; a stop priority automatic exposure mode (termed below an A-AE mode); or OFF, a stop mode of the various operations of the camera. The display unit 8' is equipped with two (2) pointer type display portions: a photographic distance display portion and a stop display portion.

Figure 12:
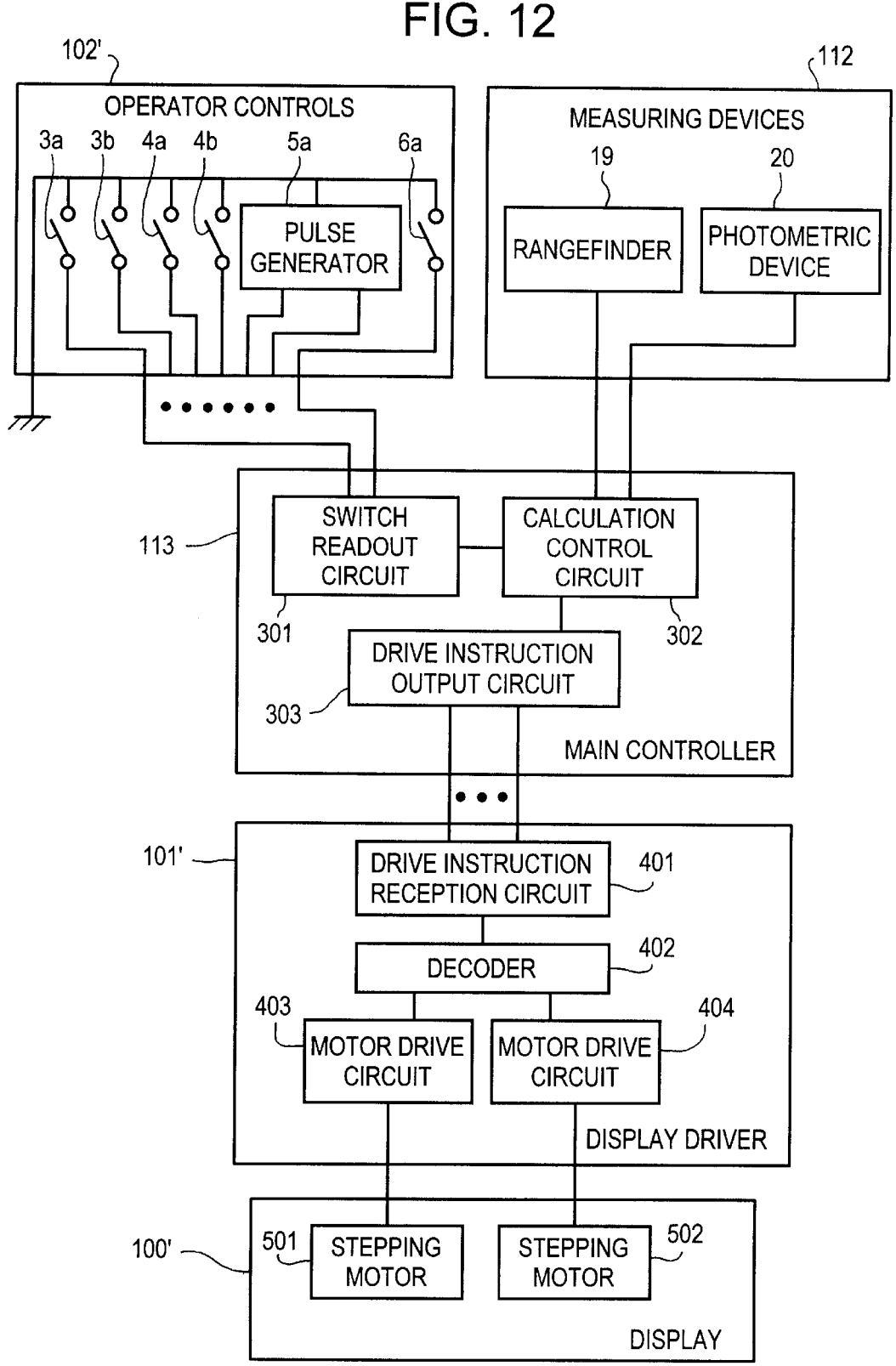
FIG. 12 is a detailed block diagram of the second embodiment illustrated in FIG. 10.

FIG. 12 is a detailed block diagram of the second embodiment illustrated in FIG. 10. The main controller 113 includes a microcomputer and peripheral components, and performs camera sequence control and various calculations, based on signals from operator controls 102' and signals from one or more measuring devices 112. The main controller 113 executes a control program as described later, to output to display driver 101' display control instructions defining a movement procedure for a pointer to reach its movement destination. The display driver 101' drives the display 100' based on the display control instructions.

The operator controls 102' include switches 3a, 3b and 6a which are set ON and OFF, in response to movement of the shutter release button 3 and AF mode button 6 as described above with respect to the first embodiment illustrated in FIG. 3. Switches 4a and 4b are set ON and OFF, according to the position of the mode selector 4'. Switch 4a is set ON when the mode selector 4' is at the P position, and switch 4b is set ON when the mode selector 4' is at A position. The pulse generator 5a generates pulses according to the rotation amount and rotation direction of the command dial 5, as described above with respect to FIG. 3. The operator controls 102' are connected to a switch readout circuit 301 within the main controller 113.

The measuring devices 112 include a rangefinder 19 and a photometer or other photometric device 20. The distance from the camera to the subject, and the luminosity of the subject, are respectively output by devices 19, 20 to a calculation control circuit 302. The calculation control circuit 302, based on the information from the switch readout circuit 301 and the measuring devices 112, controls the camera's sequence of operations and performs various calculations. In addition, a drive instruction output circuit 303, outputs to the display driver 101' signals which define a movement procedure for the pointer to reach the movement destination.

The display driver 101' receives the signals in a drive instruction reception circuit 401, separates the signals for each mode in a decoder 402, and provides decoded signals to motor drive circuits 403 and 404. The motor drive circuits 403 and 404 drive the stepping motors 101' of the display to rotate two (2) pointers and provide the visible portion of display unit 8 as illustrated in FIG. 11. The stepping motor 501 provides a rotary drive of the pointer 52 of the distance display portion 51, and the stepping motor 502 provides the rotary drive of the pointer 62 of the stop display portion 61.

Figure 13:
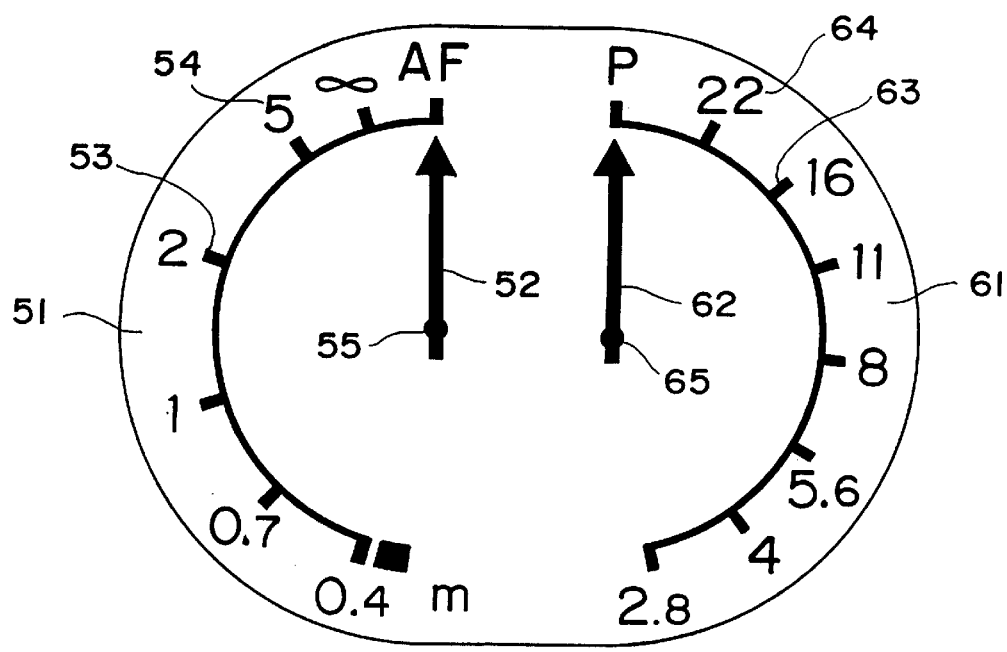
FIG. 13 is an enlarged view of the display unit in the second embodiment illustrated in FIG. 11.

FIG. 13 is an enlarged view of the display unit 8' illustrated in FIG. 11. The distance display portion 51 is the same as the distance display portion 51 of the display unit 8' in FIG. 2 and includes a pointer 52 and scale plate 53 with numerical values and symbols 54 indicating representative distances and the AF mode, to display the photographic distance. The stop display portion 61 is the same as the stop display portion 61 of the display unit 8 in FIG. 2 and includes a pointer 62 and scale plate 63 with numerical values and symbols 64 indicating stop values and the P-AE mode.

The responses of the respective displays to the operation of the camera in the second embodiment are similar to those described above for the first embodiment. When the command dial 5 rotates while the AF mode button 6 is in the ON state, the pointer 52 of the distance display portion 51, is driven to rotate in proportion to the amount of rotation in the direction of rotation. For example, in the case of changing from the autofocus (AF) mode to the infinity position ∞ of the manual focus (MF) mode, while depressing the AF mode button 6, when the command dial 5 rotates by one click in the counterclockwise direction, the pointer 52 rotates from the AF position to the infinity position ∞.

Figure 14:
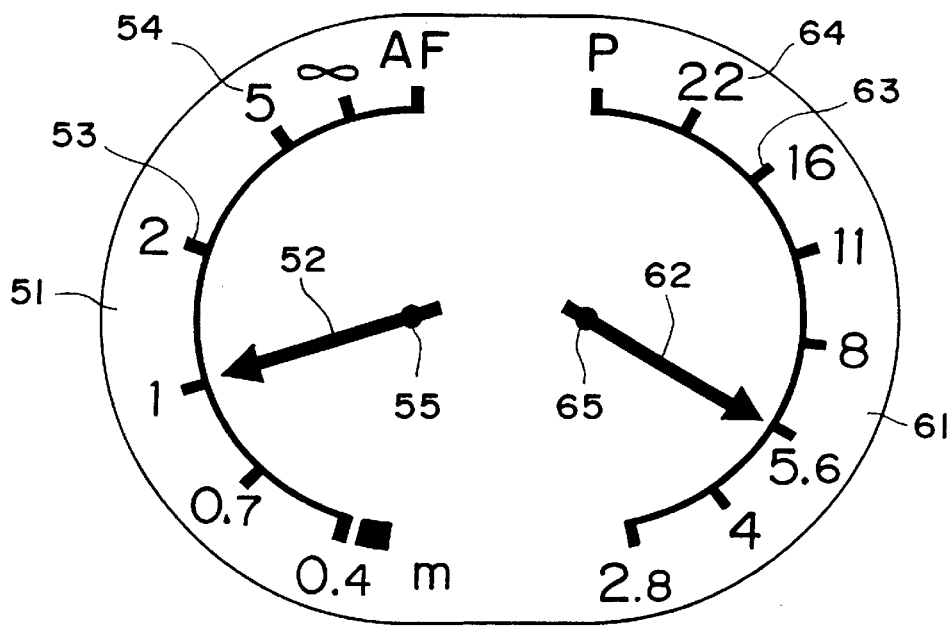
FIG. 14 is a diagram showing a display example of the display unit in the second embodiment illustrated in FIG. 11.

On the other hand, if the pointer 52 is in the AF position, indicating that the AF mode is set, when the shutter release button 3 is half depressed the pointer 52 is driven to rotate to the position of the photographic distance detected by the rangefinder 19. For example, when a photographic distance of 1 m is detected by the rangefinder 19, the pointer 52 rotates to the scale marking of 1 m as shown in FIG. 14.

When the command dial 5 rotates one click of rotation with the mode selector 4' in the state with A selected, namely in the state of the A-AE mode, the pointer 62 of the stop display portion 61 is driven to rotate 12 degrees. That is, in the case of changing from a stop of F 5.6 to a stop of F 22, the command dial 5 rotates by eight clicks in the counterclockwise direction.

On the other hand, if the mode selector 4' is in the P position, namely, the P-AE ode has been set, when the shutter release button 3 is half depressed, the switch 3a s ON and the subject luminosity has been detected by the photometric device 20, the top is found by a previously stored program graph, and the pointer 52 is driven to rotate to this stop value. For example, when a stop of F 5.6 is obtained, based on the subject luminosity detected by the photometric device 20 and the program graph, the pointer 52 rotates, as shown in FIG. 14, to the scale marking of 5.6.

Moreover, if the P-AE mode and the AF mode are set, when the shutter release button 3 is half depressed, the pointer 62 which shows the stop value and the pointer 52 which shows the distance are both driven to rotate. If the P-AE mode and the MF mode are set, when the shutter release button 3 is half depressed, only the pointer 62 which shows the stop value is driven to rotate. If the A-AE mode and the AF mode are set, when the shutter release button 3 is half depressed, only the pointer 52 which shows distance is driven to rotate. If the A-AE mode and the MF mode are set, when the shutter release button 3 is half depressed, neither pointer is driven to rotate.

The operation is described in detail below according to the flow chart illustrated in FIG. 15 of the manual distance setting procedure. When the AF mode button 6 is operated and the switch 6a is determined to be ON in step S251, the calculation control circuit 302 of the main controller 113 commences the execution of this procedure illustrated in FIG. 15. In step S253, if it is determined that pulse signals are input from the pulse generator 5a, processing continues with step S254, and if not, input of pulse signals is awaited so long as switch 6a is ON. As mentioned above, pulse signals are output from the pulse signal generator 5a according to the rotation amount and rotation direction of the command dial 5.

In step S254, according to the pulse signals which are input from the pulse generator 5a, the pointer position is calculated to drive the pointer 52 to rotate. In step S255, a pointer drive instruction is prepared to drive the pointer 52. In step S256, the pointer drive instruction is output from the drive instruction output circuit 303 as a serial or parallel logic signal. In step S257, the signal is received by the drive instruction reception circuit 401. From the received information, the decoder 402 decodes the drive information for each display in step S258. The decoded signals are used by the motor drive circuit 403 to drive S259 the stepping motor 501 in step S259 and thereby rotate the distance pointer 52 in step S260. When the pointer movement is completed, the procedure returns to step S251 to await the next switch input.

Figure 16:
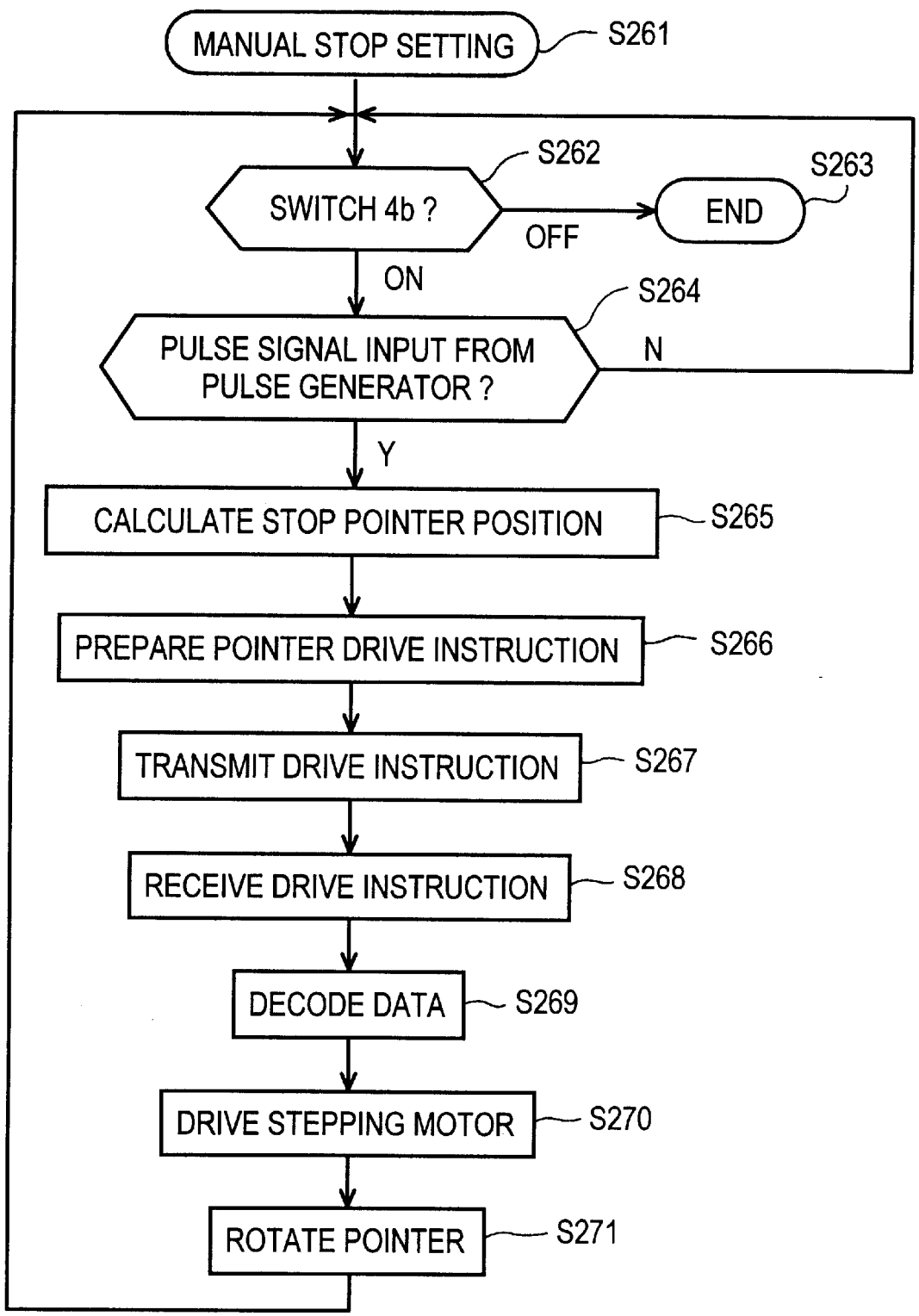
FIG. 16 is a flow chart of the manual stop setting procedure in the second embodiment.

FIG. 16 is a flow chart of the manual stop setting mode procedure in the second embodiment. The calculation control circuit 302 of the main controller 113 begins execution of the procedure illustrated in FIG. 16 when the A-AE mode has been selected by selecting A on the mode selector 4'. In step S264, it is determined whether pulse signals are input from the pulse generator 5a. If pulse signals are input, the routine proceeds to step S265. If not, as long as switch 4b is determined to be ON in step S262, the input of pulse signals is awaited. As aforementioned, the pulse generator 5a outputs pulse signals according to the amount of rotation and direction of rotation of the command dial 5.

In step S265, pointer position data is calculated according to the pulse signals input from the pulse generator 5a to drive the pointer 62 to rotate. In step S266, a pointer drive instruction is prepared to drive the pointer 62. In step S267, a drive instruction is output from the drive instruction output circuit 303 as a serial or parallel logic signal. In step S268, the signal is received by the drive instruction signal receiving circuit 401. In step S269, the decoder circuit 402 decodes the drive information of each display from the received information. By means of the decoded signal, the motor drive circuit 404 drives stepping motor 502 in step S270 to rotate the pointer 62 in step S271. When the pointer rotation is completed; the procedure returns to step S262, and the next switch input is awaited.

Figure 17:
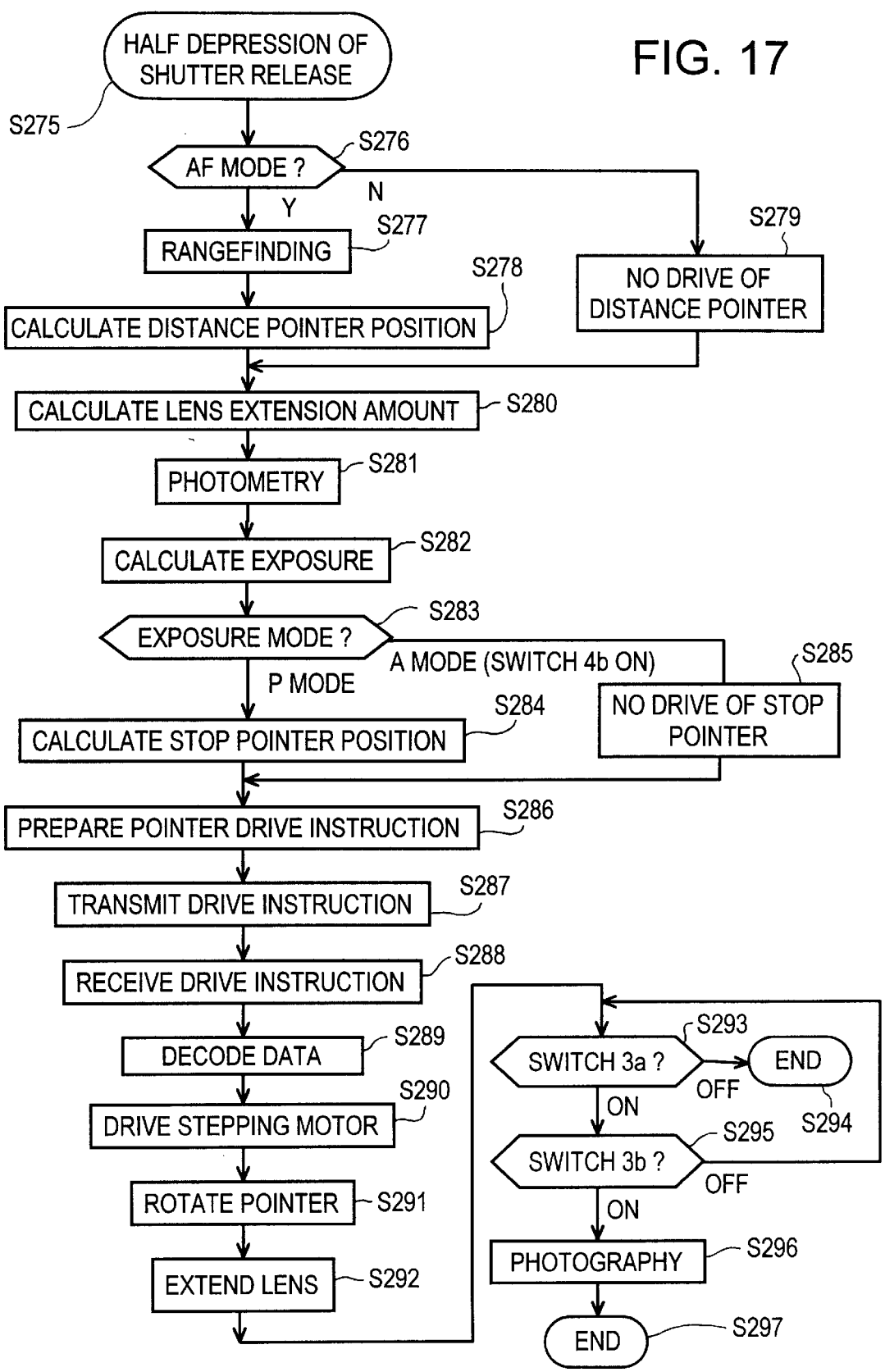
FIG. 17 is a flow chart of photographic preparation and operation in the second embodiment.

FIG. 17 is a flow chart of the shutter release procedure in the second embodiment. The calculation control circuit 302 of the main controller 113 begins execution of this procedure in step S275 when the shutter release button 3 is half depressed and the switch 3a is set ON. In step S276, it is determined whether the AF mode has been set. If the AF mode is set, the pointer 52 of the distance display portion 51 will be in the AF position as illustrated in FIG. 13 and the procedure continues with step S277. If not, it is determined that the camera is in the MF mode and the procedure continues with step S279. In the AF mode, the distance to the subject is detected by the rangefinder 19 in step S277, the distance pointer position data are calculated in step S278 and the procedure continues with step S280. However, when the MF mode is set, the manual focus adjustment procedure illustrated in FIG. 15 has already been executed and the photographic distance has been set manually by the command dial 5 and it is recorded in step S279 that there is no need to change the position of pointer 52. Next, in step S280, the lens extension amount is calculated, based on the distance result of the rangefinder 19 or on the photographic distance which has been set.

Using the subject luminosity detected in step S281 by the photometric device 20, an exposure calculation is performed in step S282. In step S283, it is determined whether the P-AE mode has been set by the mode selector 4'. If switch 4a is ON, the program exposure mode is set and the stop pointer position data is calculated in step S284 and the procedure continues with step S286. When it is determined in step S283 that the P-AE mode is not set, the procedure illustrated in FIG. 16 has already been executed to manually set the stop value using the command dial 5 and it is recorded in step S285 that there is no need to change the position of the pointer 62.

Next, in step S286, from the already set position data of the distance pointer and the stop pointer, a pointer drive instruction is prepared to drive the pointers. If it was recorded that movement of pointer 52 or 62 was unnecessary in step S279 or step S285, respectively, the drive instruction defines movement of only the other pointer. Based on the drive instruction prepared in step S286, in step S287 a pointer drive instruction signal is output from the drive instruction output circuit 303 as a serial or parallel logic signal.

In step S288 the drive instruction reception circuit 401 receives the signal. The decoder 402 decodes the received information in step S289 to obtain the drive information for each pointer. In step S290 the motor drive circuits 403 and 404, in response to the decoded signals, drive the stepping motors 501 and 502 to rotate at least one of the pointers 52 and 62 in step S291. After driving has been completed, lens extension is performed in step S292 to adjust the focus. After this, the state of the shutter release button is detected in steps S293 and S295. If the shutter release button 3 is no longer depressed, the procedure is completed (step S294). As long as the half depression state (switch 3a ON) continues, a determination is made in step S295 as to whether full depression has occurred. When the shutter release button 3 is fully depressed, switch 3b becomes ON, and a photographic operation is performed in step S296.

In summary, the pointer operations observed for the modes of the camera in the second embodiment are as follows. If the P-AE mode is set and the AE mode is also set, when the shutter release button 3 is half depressed, the pointer positions are calculated in steps S278 and S284 and the distance pointer 52 and the stop pointer 62 are both driven to rotate.

If the P-AE mode is set and the MF mode is set, when the shutter release button 3 is half depressed, the distance pointer is not driven because it is already set (step S279), and based on the pointer position calculated in step S284 only the pointer 62 which shows the stop value is driven to rotate.

If the A-AE mode is set and the AF mode is set, when the shutter release button 3 is half depressed, the stop pointer is not driven because it is already set (step 285), and based on the pointer position calculated in step S278 only the pointer 52 indicating the distance is driven to rotate.

If the A-AE mode is set and the MF mode is set, when the shutter release button 3 is half depressed, neither pointer is driven to rotate because the stop pointer and the distance pointer are already set (steps S279 and S285).

As described above, the main controller 113 prepares pointer drive instructions, and transmits them to the driver 101' based on the signals from the operator controls 102' and the measurement results from the measuring devices 112. A first example using four pointer drive instructions is shown in Table 1. When instruction no. 1 is transmitted, the display driver 101' rotates the stop pointer 12 degrees in a clockwise direction. Similarly, when instructions nos. 2, 3 and 4 are transmitted, the pointers are rotated as indicated in Table 1. In the manual distance setting and manual stop setting procedures illustrated in the flow charts of FIGS. 15 and 16, each 1 click of rotation of the command dial 5 causes the appropriate pointer to be driven by transmission of one of the instruction nos. 1 through 4, and a small number of instructions are used to perform the required movements of the pointers.

TABLE 1

Pointer drive instruction code summary 1

| Pointer | Instruction Code | Instruction No. | Operation |
| --- | --- | --- | --- |
| Stop pointer | 001 | 1 | Rotate stop pointer 12° clockwise |
| | 010 | 2 | Rotate stop pointer 12° counterclockwise |
| Distance pointer | 011 | 3 | Rotate distance pointer 12° clockwise |
| | 100 | 4 | Rotate distance pointer 12° counterclockwise |

However, when the instructions of Table 1 are used to control rotation of pointers automatically based on the measurement results in response to half depression of the shutter release button 3, continuous smooth rotation is hardly possible, and the process of the calculation control circuit becomes complicated. In particular, in the case of moving two pointers simultaneously, complicated instructions have to be transmitted and each pointer is driven alternately by 12 degrees.

Table 2 shows a second example of pointer drive instructions. This instruction uses the pointer drive point position code summary table in Table 3. For example, when instruction 5 transmits a continuous 48° instruction code "0101", the display driver rotates the stop pointer clockwise to a 48° position. This instruction transmits an absolute position unrelated to the previous position of the pointer, and drives the pointer to this position.

TABLE 2

Pointer drive instruction code summary 2

| Pointer | Instruction code | Instruction No. | Operation |
|---|---|---|---|
| Stop Pointer | 01 | 5 | Rotate stop pointer to position shown by Table 3 code |
| Distance Pointer | 10 | 6 | Rotate distance pointer to position shown by Table 3 code |

Each of the abovementioned operations can be implemented using the commands in the second example. When the instructions of Table 2 are applied for the rotation of pointers according to the measurement results as illustrated in the flow chart of FIG. 17, since an absolute position is transmitted and the pointer is driven to the absolute position, continuous smooth rotation is possible and it is a simple process to transmit the appropriate instruction. However, for the manual distance setting and manual stop setting illustrated in the flow charts of FIGS. 15 and 16, a rotation of 1 click of the command dial 5, it is more complicated to determine the instruction containing the movement destination code to be transmitted.

The display driver 101' normally has to process instructions with a large amount of information. For example, if the transmission from the main controller 113 to the display driver 101' is four bits wide, two transmissions are required for the six bits required by a single instruction in the second example. If a circuit with a slow processing speed is used as a display driver, the result is that the operation of the display is slow, particularly in manually setting by use of the command dial 5. An inconvenience arises in that the pointer does not closely follow the rotation of the command dial 5.

TABLE 3

Pointer drive point position code summary
Directly above as 0°, clockwise direction rotation as +.

| Instruction code | Stop pointer | Distance pointer |
|---|---|---|
| 0001 | 0° | 0° |
| 0010 | 12° | −12° |
| 0011 | 24° | −24° |
| 0100 | 36° | −36° |
| 0101 | 48° | −48° |
| 0110 | 60° | −60° |
| 0111 | 72° | −72° |
| 1000 | 84° | −84° |
| 1001 | 96° | −96° |
| 1010 | 108° | −108° |
| 1011 | 120° | −120° |
| 1100 | 132° | −132° |
| 1101 | 144° | −144° |

TABLE 3-continued

Pointer drive point position code summary
Directly above as 0°, clockwise direction rotation as +.

| Instruction code | Stop pointer | Distance pointer |
|---|---|---|
| 1110 | 156° | −156° |
| 1111 | 168° | −168° |

Table 4 shows a third example of pointer drive instruction codes which solves the problems discussed above. Instruction nos. 11, 12, 14, 15 and 18 independently are possible instructions of pointer motion; instruction nos. 13, 16 and 17 are used in conjunction with the pointer drive point position codes of Table 3. Instruction nos. 11, 12, 14 and 15 are the same as instructions 1 through 4 in Table 1.

TABLE 4

Pointer drive instruction code summary 3

| Pointer | Instr. Code | Instr. No. | Operation |
|---|---|---|---|
| Stop pointer | 0001 | 11 | Rotate stop pointer 12° clockwise |
| | 0010 | 12 | Rotate stop pointer 12° counterclockwise |
| | 0011 | 13 | Rotate stop pointer to indicated position. After this instruction, send position data shown in Table 3. |
| Distance pointer | 0101 | 14 | Rotate distance pointer 12° clockwise |
| | 0110 | 15 | Rotate distance pointer 12° counter-clockwise |
| | 0111 | 16 | Rotate distance pointer to indicated position. After this instruction, send position data shown in Table 3. |
| Stop pointer Distance pointer Simultaneous drive | 1001 | 17 | Rotate both stop pointer and distance pointer up to indicated position. After this instruction, send position data shown in Table 3 corresponding to respective indicated positions of distance pointer and stop pointer. |
| | 1010 | 18 | Rotate both stop pointer and distance pointer up to standard position (0°) of both. |

Instruction no. 17 is an instruction to rotate both the stop pointer and the distance pointer simultaneously to the indicated position at the time of half depression of the shutter release button 3 in the P-AE and AF modes.

Instruction no. 18 is an instruction for the stop pointer and the distance pointer to be both simultaneously returned to the standard state. This instruction is used when the half depression of the shutter release button 3 is canceled in the P-AE or AF mode. Instruction nos. 13 and 16 are the same as instruction nos. 5 and 6 in Table 2.

Figure 15:
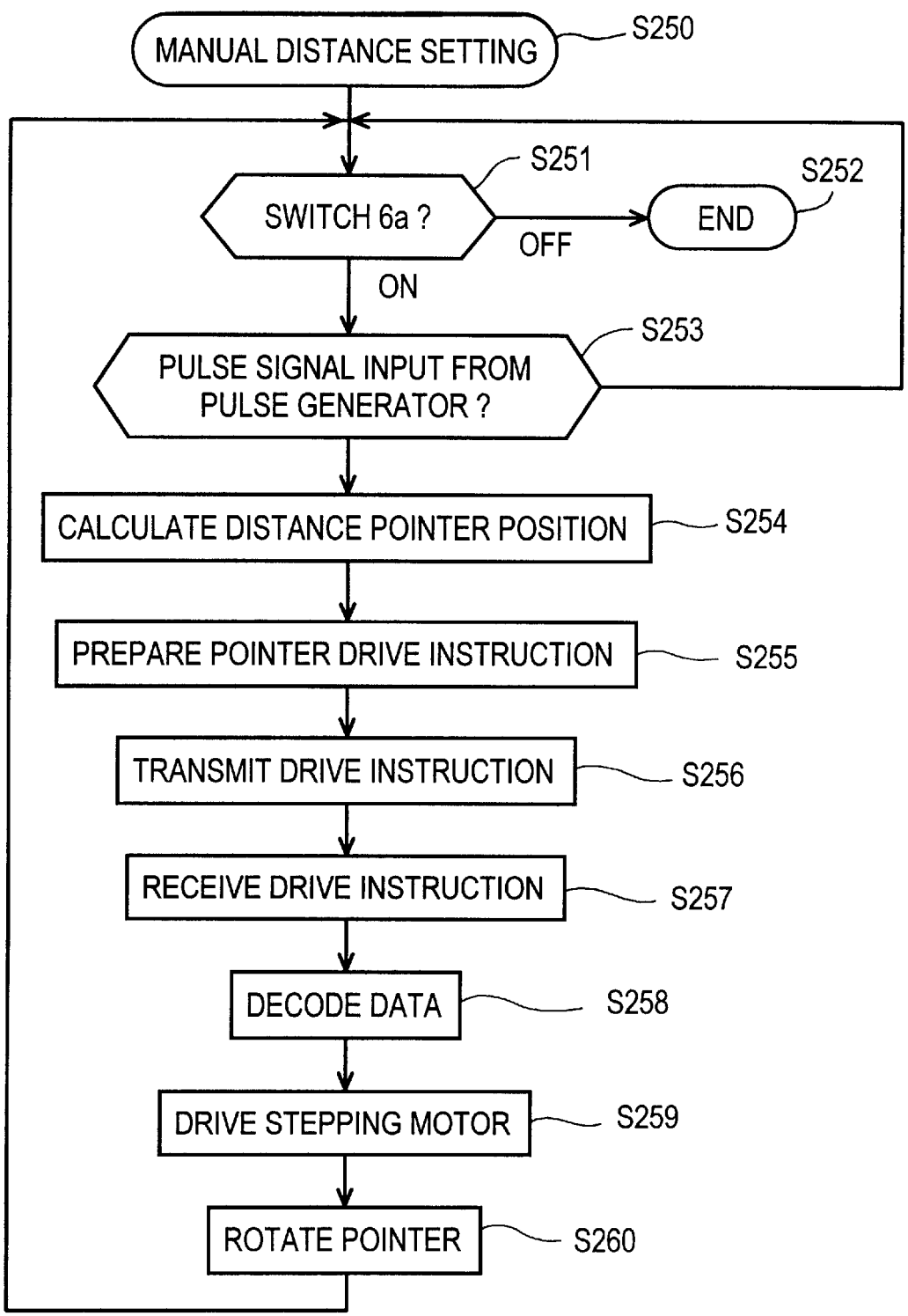
FIG. 15 is a flow chart of the manual distance setting procedure in the second embodiment.

When using the third example of instruction codes, the manual distance and manual drive setting procedures illustrated in FIGS. 15 and 16 can transmit the instruction for 1 click rotation of the command dial 5 in four bits to complete transmission in 1 cycle. As a result, it is possible for the display drive to follow the rotation of the command dial 5. Moreover it is possible to obtain smooth pointer rotation according to the measurement results at the time of half depression of the shutter release button 3 illustrated in the flow chart of FIG. 17, because the absolute position is transmitted.

In the instruction code examples above, the present invention has been applied to a camera display device, but the present invention is not limited to the display device of a camera, and it goes without saying that it is possible to apply the present invention to other articles having a similar display configuration.

As described above, a main controller 113 controls the sequence, exposure calculations, and the like, of a camera. A display driver 101' drives a pointer display based on serial or parallel logic signals from the main controller 113. The logic signals may include an indication angle needle manipulation instruction to rotate one pointer by a predetermined angle in an indication direction; a movement destination indication needle manipulation instruction to manipulate one pointer to an indication position; a two-needle standard position needle manipulation instruction to drive two pointers simultaneously to standard positions; and a two-needle movement destination indication needle manipulation instruction to rotate two needles simultaneously to indicated positions. Using such instructions, the number of instructions is kept small and needle manipulation is possible with fast response according to the operation of the camera.

Although a few preferred embodiments of the present invention have been shown and described, it will be appreciated by those skilled in the art that changes may be made in these embodiments, without departing from the principles and the spirit of the invention, the scope of which is defined in the claims and their equivalents.

What is claimed is:

1. A display device, comprising:

a display to display physical quantities by pointers moving over a scale plate;

a display driver to drive the pointers;

operator controls to change the physical quantities displayed by said display in response to manipulation by an operator;

an electrical supply detector to generate a voltage change signal upon detection of at least one of battery exchange and an electrical supply voltage below a predetermined voltage;

a memory to store movement information representative of the physical quantities displayed by said display; and a controller to control driving of said display by said display driver in response to the manipulation of said operator controls and storing of the movement information in said memory when the voltage change signal is generated by said electrical supply detector, and to control movement of the pointers by said display driver to standard positions based on the movement information stored in said memory.

2. A display device, comprising:

a display to display physical quantities by pointers moving over a scale plate;

a display driver to drive the pointers;

operator controls to change the physical quantities displayed by said display in response to manipulation by an operator;

an electrical supply detector to generate a voltage change signal upon detection of at least one of battery exchange and an electrical supply voltage below a predetermined voltage;

a memory to store movement information representative of the physical quantities displayed by said display; and a controller to control driving of said display by said display driver in response to the manipulation of said operator controls and storing of the movement information in said memory when the voltage change signal is generated by said electrical supply detector, and to control movement of the pointers by said display driver, based on the movement information stored in said memory to standard positions and then to positions corresponding to the movement information stored in said memory.

* * * * *